United States Patent
Mevissen et al.

[19]

[11] Patent Number: 6,083,130
[45] Date of Patent: Jul. 4, 2000

[54] SERPENTINE DRIVE SYSTEM WITH IMPROVED OVER-RUNNING ALTERNATOR DECOUPLER

[75] Inventors: Pierre A. Mevissen, Richmond Hill; Kin Lam, North York; Mats K. Lipowski, Toronto; Klaus K. Bytzek, Schomberg; Henry W. Thomey, Guilford, all of Canada

[73] Assignee: Litens Automotive Partnership, Woodbridge, Canada

[21] Appl. No.: 09/073,916

[22] Filed: May 7, 1998

Related U.S. Application Data

[60] Provisional application No. 60/045,851, May 7, 1997, provisional application No. 60/051,566, Jul. 2, 1997, and provisional application No. 60/061,566, Oct. 10, 1997.

[51] Int. Cl.[7] ............................. F16H 9/00; F16D 11/00; F16D 11/06
[52] U.S. Cl. ............................. 474/70; 474/69; 474/74; 192/415; 192/107 T
[58] Field of Search ............................. 474/70, 74, 170, 474/135, 133, 166, 174, 902, 903, 167, 112; 192/41 S, 56 C, 56, 81 C, 107 T, 107 M

[56] References Cited

U.S. PATENT DOCUMENTS

| | | |
|---|---|---|
| 2,866,349 | 12/1958 | Heckethorn ..................... 192/41 R X |
| 2,911,961 | 11/1959 | McRae . |
| 3,048,056 | 8/1962 | Wolfram . |
| 3,395,553 | 8/1968 | Stout ................................ 64/15 |
| 3,618,730 | 11/1971 | Mould . |
| 3,893,554 | 7/1975 | Wason .............................. 192/56 |
| 4,433,765 | 2/1984 | Rude et al. ..................... 192/41 |
| 4,725,259 | 2/1988 | Miyata . |
| 4,725,260 | 2/1988 | Komorowski et al. ............ 474/133 |
| 4,808,148 | 2/1989 | Holtz . |

(List continued on next page.)

FOREIGN PATENT DOCUMENTS

| | | |
|---|---|---|
| 2 676 789 | 11/1992 | France . |
| 19 62 011 | 6/1970 | Germany . |

(List continued on next page.)

*Primary Examiner*—David A. Bucci
*Assistant Examiner*—Marcus Charles
*Attorney, Agent, or Firm*—Pillsbury Madison & Sutro LLP

[57] ABSTRACT

A serpentine belt drive system for an automotive vehicle comprising a drive assembly including an internal combustion engine having an output shaft with a driving pulley thereon rotatable about a driving pulley axis. A sequence of driven assemblies each has a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause said driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring member separately formed from and connected in series with a one-way clutch member. The resilient spring member is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch member is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

56 Claims, 17 Drawing Sheets

U.S. PATENT DOCUMENTS

| | | |
|---|---|---|
| 4,923,435 | 5/1990 | Kadota et al. . |
| 5,012,905 | 5/1991 | Tanaka ............................ 192/107 T X |
| 5,139,463 | 8/1992 | Bytzek et al. . |
| 5,156,573 | 10/1992 | Bytzek et al. . |
| 5,377,962 | 1/1995 | Winfried et al. . |
| 5,383,542 | 1/1995 | Stockton . |
| 5,598,913 | 2/1997 | Monahan et al. . |
| 5,638,931 | 6/1997 | Kerr . |
| 5,665,018 | 9/1997 | Miyata . |
| 5,675,202 | 10/1997 | Zenmei et al. . |
| 5,676,225 | 10/1997 | Miyata . |
| 5,680,921 | 10/1997 | Vierk et al. ......................... 192/107 T |

FOREIGN PATENT DOCUMENTS

| | | |
|---|---|---|
| 3442308 | 5/1986 | Germany . |
| 575 067 | 2/1946 | United Kingdom . |
| 2 250 566 | 6/1992 | United Kingdom . |
| WO 96/12122 | 4/1996 | WIPO ........................... F16F 15/123 |

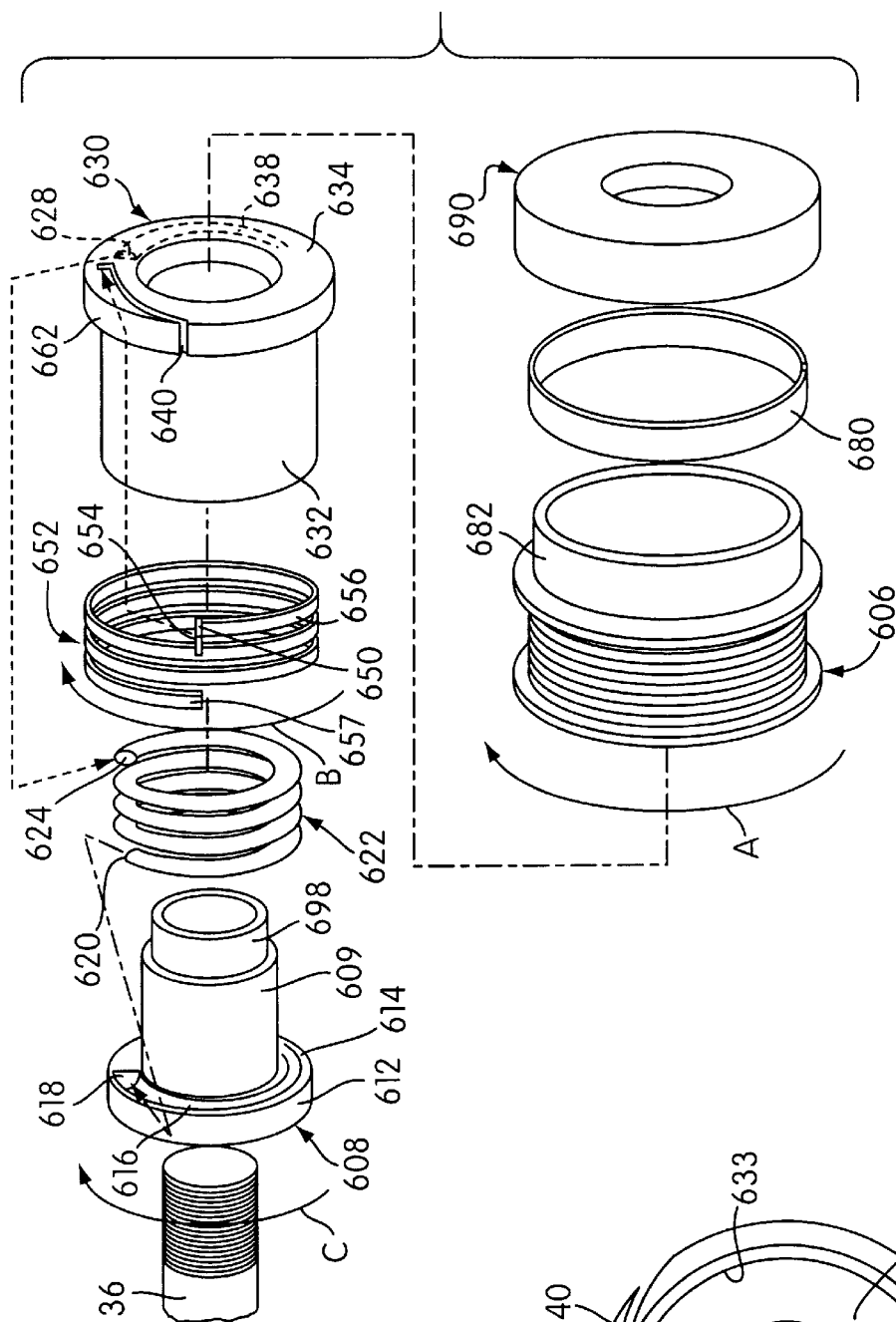
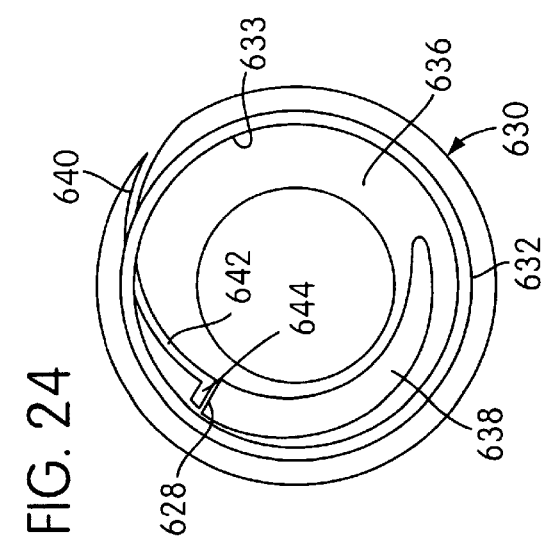
FIG. 23
FIG. 24

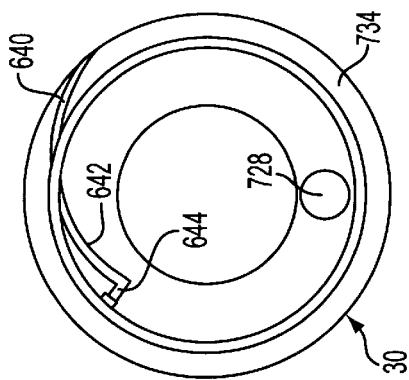
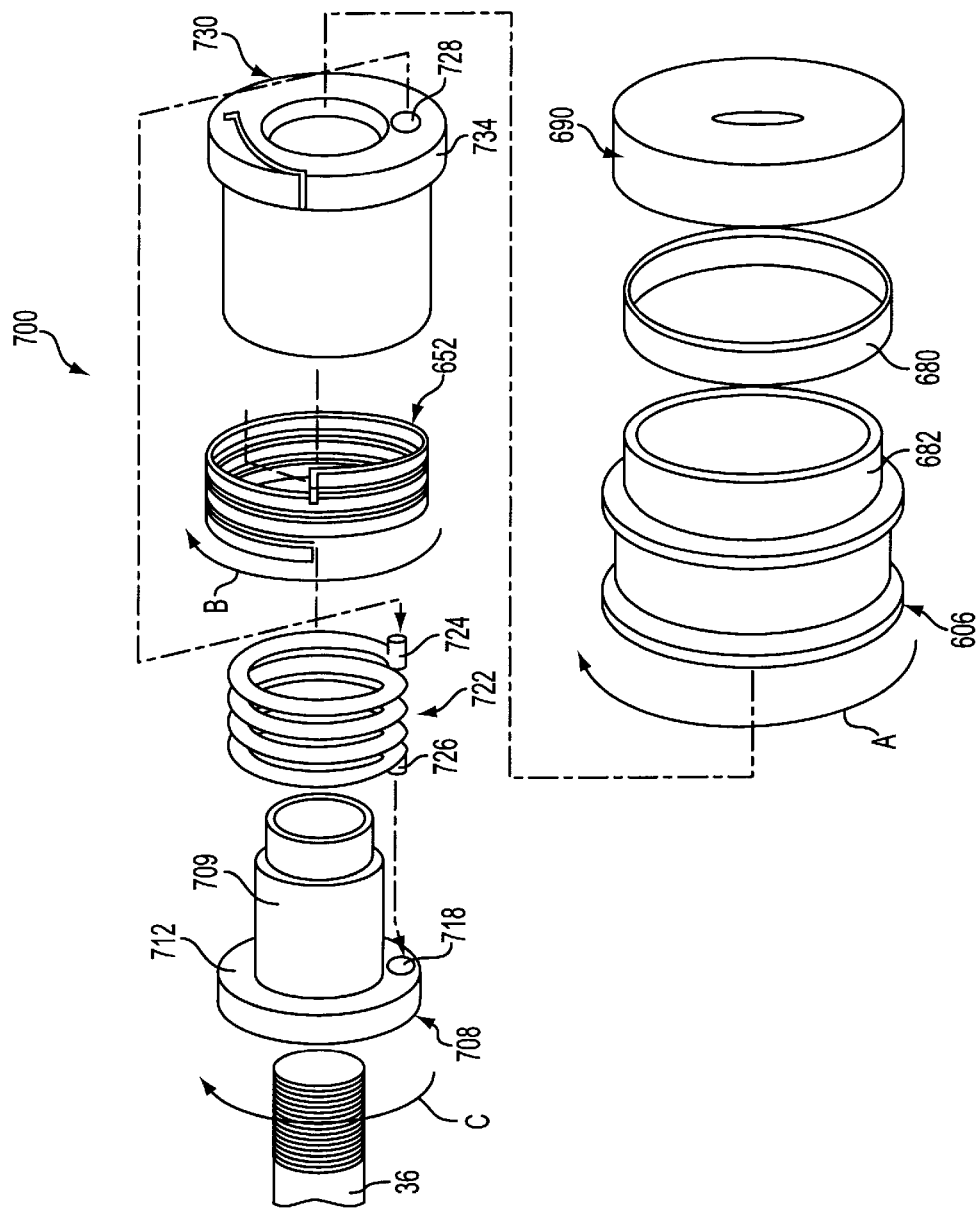
FIG. 26
FIG. 25

SERPENTINE DRIVE SYSTEM WITH IMPROVED OVER-RUNNING ALTERNATOR DECOUPLER

This application claims benefit of provisional application Ser. No. 60/045,851 filed May 7, 1997 which is a provisional of Ser. No. 60/051,506 filed Jul. 2, 1997 which is a provisional of Ser. No. 60/061,566 filed Oct. 10, 1997.

BACKGROUND

This invention relates to drive systems and more particularly serpentine accessory drive systems for automotive vehicles.

These systems are in common use to transfer power from an internal combustion engine crankshaft to accessory components typically including an alternator (generator), water pump, oil pump (power steering), air conditioning compressor (via electromechanical clutch). These components are usually fixed position mounted and utilize an automatic belt tensioner to provide constant belt tension and take-up of belt slack.

Internal combustion engines generate rotating power at the crankshaft only when a combustion event occurs. This, in effect, is a pulsed system whereby the closer the spacing of the combustion events, the smoother the rotational consistency of the engine. For each combustion stroke, the crankshaft will exhibit acceleration, then deceleration, until the next combustion stroke. In general, the slower the rotation of the engine, and the lesser number of cylinders (combustion events per revolution of crankshaft) tends to increase the magnitude of the pulsing effect. Fuel burn characteristics also have a substantial influence, for example, the instantaneous acceleration of the crankshaft on a diesel engine is much greater than a similar gasoline fueled engine due to the combustion process itself.

In terms of the serpentine belt system, the crankshaft pulses are transferred to the belt as fluctuations in velocity. The velocity fluctuations of the engine are thus transferred to all the driven components in the system. Dynamic belt tension fluctuation is generated by the velocity fluctuation. Without considering the dynamic loading of the accessory components and consequent tension effects, it is obvious that the driven inertias will generate dynamic tensions as the belt continuously attempts to accelerate and decelerate such components. The magnitude of force required is proportional to the inertia and to the driven ratio. The function is squared.

Where the engine is smaller, four or five cylinders, and in the lowest speed ranges (idling area) the dynamic tension fluctuation is at the highest magnitude. The magnitude can be further increased by technological differences that serve to lower the engine rotating inertia (dual mass fly wheel) or increase the instantaneous acceleration (diesel, higher compression, etc.). Operating conditions can also have a significant effect, for instance, "lugging" where the engine is running below its ideal minimum speed (idle) at high power levels that attempt to increase the speed back to idle.

Under these circumstances, the dynamic belt loading can be so great that the belt tensioner cannot accommodate all the dynamic fluctuations. The results can include belt noise, belt slippage and forced vibration of the belt, tensioner and accessory components. Ultimately, durability is compromised.

It is possible to resolve this problem using a torsional isolator at the crankshaft, provided it has low stiffness. Such conventional torsional isolators have been employed for many years, but are bulky, costly, heavy, and display limited effectiveness. This limited effectiveness is generally the result of the drive having to be designed to carry the full power capability of the system, while rarely ever requiring the same. Thus, torsional isolators are typically too stiff.

Commonly assigned U.S. Pat. No. 5,156,573 ("the '573 patent"), hereby incorporated by reference, discloses a serpentine drive system for an automotive vehicle which provides a coil spring and one-way clutch mechanism between the alternator pulley and mounting hub structure. The disclosed preferred embodiment of the mechanism takes the form of a generally helical coil of spring steel, which performs the dual function of 1) resiliently transmitting driven rotational movements of the alternator pulley to the hub such that the alternator shaft is rotated in the same direction as the pulley while being capable of instantaneous relative resilient rotational movements in opposite directions with respect to the pulley during driven rotational movement of the pulley, and (2) decoupling the alternator pulley from the hub so that the hub structure and hence the alternator shaft can rotate at a speed in excess of the rotational speed of the alternator pulley when the speed of the engine output shaft is decelerated to an extent sufficient to establish the torque between the alternator pulley and the hub structure at a predetermined negative level.

Each of the two functions noted above has different engineering requirements for optimizing the system. For example, the resilient coupling function would optimally have a greater spring rate (a stiffer spring) than the spring rate utilized for performing the coupling/decoupling function. Optimally, a higher spring rate is desirable for transmitting driven rotational movement of the alternator pulley to the hub structure in order to accommodate the relatively high torsional forces, while a lower spring rate is desirable for the de-coupling function so that less force is exerted and thus less frictional wear and heat is generated by the mechanism during the de-coupling or overrun condition. Increasing the spring rate of the mechanism to accommodate the torsion transmitting function would be to the detriment of the coupling/de-coupling function, while decreasing the spring rate to accommodate the coupling/de-coupling function would be to the detriment of the torsion transmitting function. As another example, the coupling/de-coupling function ideally requires a material having a higher coefficient of friction than than required for the torsion transmitting function.

It is an object of the present invention to provide an improved serpentine belt drive system which individually optimizes the two functions noted above. In accordance with this object, the present invention provides a serpentine belt drive system for an automotive vehicle comprising a drive assembly including an internal combustion engine having an output shaft with a driving pulley thereon rotatable about a driving pulley axis. A sequence of driven assemblies each has a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause said driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring member separately formed from and connected in series with a one-way clutch member. The resilient spring member is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch member is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

It is a further object of the invention to provide a device which addresses the issues noted above and can be used to transmit movement from a belt driven by an output shaft of an engine to a shaft of an auxiliary component to be driven. The device comprises a hub structure, a pulley member, and a spring and one-way clutch mechanism. The hub structure is constructed and arranged to be fixedly carried by the shaft for rotation therewith about a shaft axis. The pulley member is mounted on the hub structure and constructed and arranged to engage the belt and be rotatably driven thereby. The spring and one-way clutch mechanism couples the pulley member with the hub structure. The spring and one-way clutch mechanism comprises a resilient spring member separately formed from and connected in series with a one-way clutch member. The resilient spring member is constructed and arranged to transmit the driven rotational movements of the pulley member to the hub structure such that the shaft is rotated in the same direction as the pulley while being capable of instantaneous relative resilient movements in opposite directions with respect to the pulley during the driven rotational movement thereof. The one-way clutch member is constructed and arranged to allow the hub structure and hence the shaft to rotate at a speed in excess of the rotational speed of the pulley when the speed of the driven pulley is decelerated to a predetermined extent.

It is a further object of the present invention to provide a serpentine belt drive system in which optimizes the spring rates discussed above. In accordance with this object, the present invention provides a serpentine belt drive system for an automotive vehicle comprising a drive assembly including an internal combustion engine having an output shaft with a driving pulley thereon rotatable about a driving pulley axis, a sequence of driven assemblies each having a driven pulley rotatable about an axis parallel with the driving pulley axis, and a serpentine belt mounted in cooperating relation with the driving pulley and with the driven pulleys in a sequence which corresponds with the sequence of the driven assemblies when related to the direction of movement of the belt to cause the driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring portion disposed in series with a one-way clutch portion, the resilient spring portion having a torsional spring rate at least ten times greater than a torsional spring rate of the one-way clutch portion. The resilient spring portion is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch portion is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

Another object of the invention is to provide a spring and one-way clutch mechanism having a clutch portion with a greater coefficient of friction than the spring portion.

Another object of the invention is to provide a spring and one-way clutch mechanism in which the clutch portion expands radially outwardly and is thus assisted by centrifugal force when engaging the alternator pulley to be coupled.

This invention is based on the fact that the effective inertia of the alternator is by far the largest in a typical accessory drive system, but uses only a portion of the power requirement for the system. If the apparent inertia can be reduced, the dynamic tension fluctuation can also be greatly reduced. By providing an effective decoupling function between the alternator pulse and the alternator rotor (armature), the apparent inertia can be significantly reduced.

It is important to note that the decoupler resilience or elasticity must be sufficiently soft so that amplification of velocity fluctuation at the pulley cannot be transmitted to the rotor in the normal operating speed range of engine where maximum dynamic tension control is desired.

The present invention provides a torque sensitive one-way clutch connected in series with a separate decoupling resilient or elastic element. It will be shown that the one-way clutch provides additional value in solving other problems, while performing its major function of maximizing the durability of the resilient or elastic decoupler.

At higher than idle operating speeds, a sudden belt deceleration can impose large tension reversals into the belt as it attempts to slow the rotor mass. These decelerations commonly occur at transmission gear shifts or "throttle bursts" (i.e. reving the engine while warming the car). In addition to cumulative belt fatigue damage, squeal noise often occurs, especially if the tensioner is forced against its fixed stop due to tension reversal. Due to the torque sensitive nature of the clutch in accordance with the present invention, as soon as the torque load shifts through zero, the clutch will release the couple between the pulley and rotor. The alternator rotor will be free to decelerate independently of the belt under an applied drag or braking torque. The belt will see only a very small tension reversal, the equivalent of the breaking torque. This characteristic will eliminate deceleration sensitivity in such systems Other objects and advantages of the present invention will be appreciated from the following detailed description, drawings and claims.

BRIEF DESCRIPTION OF THE DRAWINGS

FIG. 23 is an exploded perspective view of the alternator decoupler illustrated in FIG. 22 in accordance with the fourteenth embodiment of the present invention;

FIG. 24 is a rear end plan view of a carrier connecting structure utilized in the fourteenth embodiment illustrated in FIGS. 22 and 23;

FIG. 25 is an exploded view of a fifteenth embodiment of an overrunning alternator decoupler in accordance with the principles of the present invention;

FIG. 26 is a rear end plan view of a carrier connecting structure utilized in the fifteenth embodiment illustrated in FIG. 25.

DETAILED DESCRIPTION OF THE DRAWINGS

Structural Description

Figure 1:
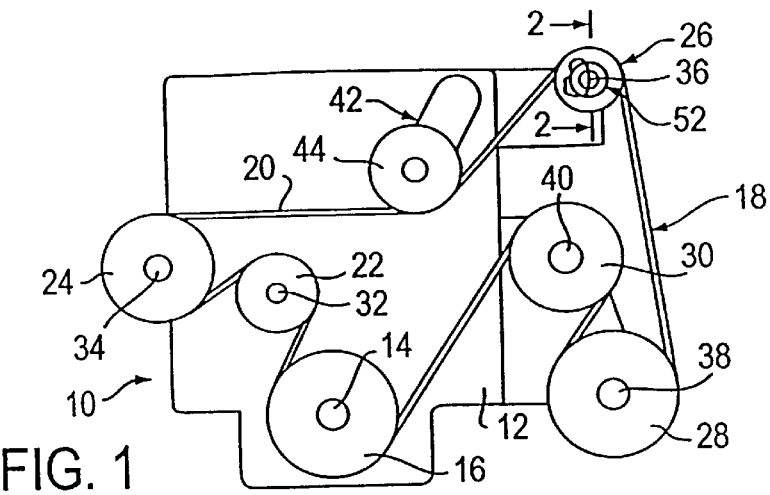
FIG. 1 is a front elevational view of an automobile internal combustion engine having a serpentine drive system embodying the principles of the present invention connected therewith.

Referring now more particularly to the drawings, there is shown in FIG. 1 an automotive internal combustion engine, generally indicated at 10, which includes a schematically indicated engine frame 12 and an output shaft 14. Fixed to the output shaft 14 is a driving pulley 16 forming part of a serpentine drive system, generally indicated at 18. The drive system 18 includes an endless belt 20. The belt 20 is of the thin flexible type, as, for example, a poly-V belt. The belt 20 is trained about the driving pulley 16 and a sequence of driven pulley assemblies 22, 24, 26, 28, and 30, each of which is fixed to a respective shaft 32, 34, 36, 38, and 40. Except for the pulley assembly 22, which is a simple idler pulley, the shafts are connected to operate various engine or vehicle accessories. For example, shaft 34 drives an engine water pump, shaft 36 an electrical alternator, shaft 38 an electromagnetic clutch of a compressor for an air-conditioning system for the automobile, and shaft 40 an oil pump of the power steering system.

It will be understood that the internal combustion engine 10 may be of any known construction. In accordance with conventional practice, the operation of the engine is such as to impart vibratory forces to the engine frame 12. All of the accessories are mounted on the engine frame 12 so that the shafts are rotated about parallel axes which are fixed with respect to the engine frame 12 and parallel with the output shaft 14 thereof. The belt 20 is tensioned by a belt tensioner, generally indicated at 42 which may be of any construction. However, a preferred embodiment is the tensioner disclosed in commonly assigned U.S. Pat. No. 4,473,362, the disclosure of which is hereby incorporated by reference into the present specification.

As shown, the belt tensioner 42 includes an idler pulley 44 which is disposed in rolling engagement with the flat back surface of the belt 20, the tensioner pulley being spring biased to maintain a generally constant tension in the belt 20.

Figure 2:
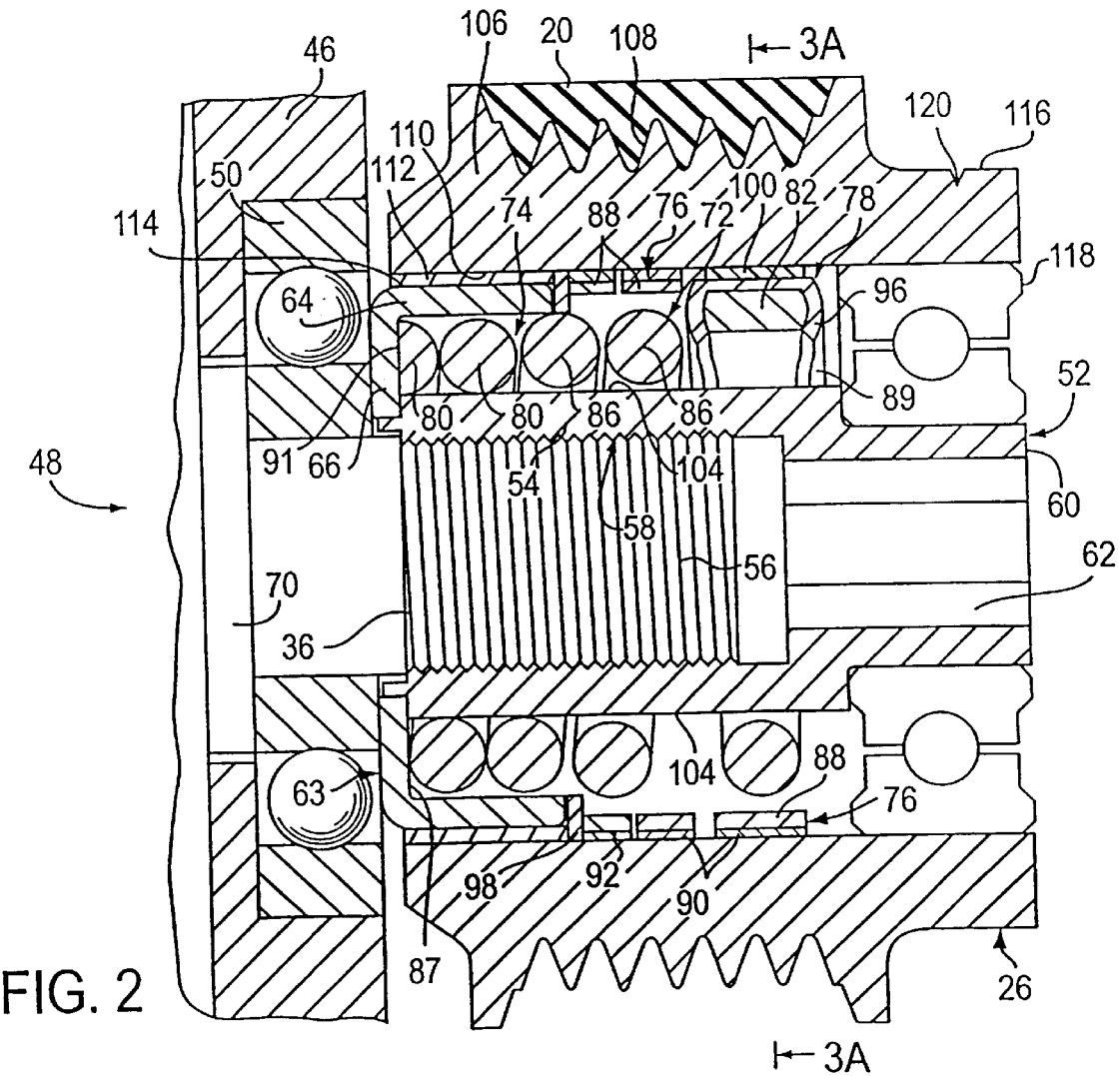
FIG. 2 is an enlarged fragmentary sectional view taken along the line 2—2 of FIG. 1.

The present invention is more particularly concerned with the pulley assembly, generally indicated at 26 and constituting an alternator decoupler assembly, which is mounted on the shaft 36 of an alternator. As best shown in FIG. 2, the alternator includes a housing 46 within which the armature assembly, generally indicated at 48, is journalled, as by a ball bearing member 50. As shown, alternator shaft 36 forms a part of the armature assembly 48 and includes an end portion extending outwardly of the alternator housing 46.

Fixed to the outwardly extending end of the electrical alternator shaft 36 is a hub structure, generally indicated at 52. As shown, the hub structure 52 includes an inner sleeve 54 which extends over the end of the electrical alternator shaft 36 end portion. As shown, the extremity of the shaft 36 is threaded as indicated at 56 and the sleeve 54 is formed with a series of interior threads 58 which are disposed in meshing relation with the threads on the end of the shaft 36. The inner sleeve 54 includes an annular end surface 60 which is formed to provide a hexagonal socket 62 for the purpose of receiving a tool for securing the sleeve 54 over the shaft 36 by relative rotation between the sleeve 54 and shaft 36.

A journal member 63 is fitted onto an annular flange at an end of hub 52 opposite the surface 60. The journal member 63 includes an axially extending cylindrical outer sleeve portion 64 and a radially inwardly extending flange portion 66 extending radially inwardly from an axial end of the outer sleeve portion 64 closest to the alternator. As shown in FIG. 2, the radially inwardly extending flange portion 66 engages the inner race of ball bearing member 50 on the electrical alternator shaft 36. When the inner sleeve 54 is tightened on the end of the shaft 36, the tightening action serves to fixedly mount the inner race of the ball bearing 50 against a flange 70 on the shaft 36 and to fixedly secure the hub structure 52 therewith including both the inner sleeve 54 and the outer sleeve 64.

In accordance with the principles of the present invention, the alternator decoupler or pulley assembly 26 has a belt engaging pulley member 106 (which will be described later in greater detail) operatively connected with the hub structure 52 by a resilient member and a one-way clutch mechanism connected to one another, as generally indicated at 72. The mechanism 72 is preferably in the form of a combination of generally helical coil or torsion spring 74 made of spring steel, and a separate wrap spring clutch element 76 connected to the spring 74 at a common end connection 78.

The helical coil of spring steel 74 includes a first plurality of volutes 80 towards one end thereof, a flattened volute portion 82 towards the opposite and thereof, and a series of intermediate volutes 86 extending therebetween. The first plurality of volutes 80 are press fitted into gripping, non-slip engagement with an exterior surface 104 of the inner sleeve 54. An arcuate end surface of the first plurality of volutes 80 facing in an axial direction towards the alternator engages an annular interior surface 87 of the flange portion 66. As shown, the arcuate end surface of the first plurality of volutes 80 includes a flattened surface portion 91 cut into the first volute to provide a greater area of surface engagement between the first volute and surface 87 of flange portion 66.

The intermediate volutes 86 are of greater diameter than the first plurality of volutes 80 and are preferably free from engagement with other structure to provide a resilient decoupling function as will be described in greater detail later.

The wrap spring clutch element 76 preferably comprises a spirally shaped spring steel band 88 with a rubber friction enhancing material 90, preferably T-701 rubber based material manufactured by Thermoset Inc., adhesively bonded to the radially exterior surface thereof. As can be more fully appreciated from FIGS. 3A, 3B, and 4, generally at the connection 78 between the wrap spring clutch element 76 and torsional coil spring element 74, the steel band 88 extends beyond the friction material 90 and has an expanded width portion 96 which is crimped in surrounding, form locking relation with respect to the end of spring 74 as shown. The crimped portion 96 preferably has a diameter that tapers or becomes less as it approaches the friction material 90, as does the received end portion of spring 74 to form a taper lock.

Figure 3A:
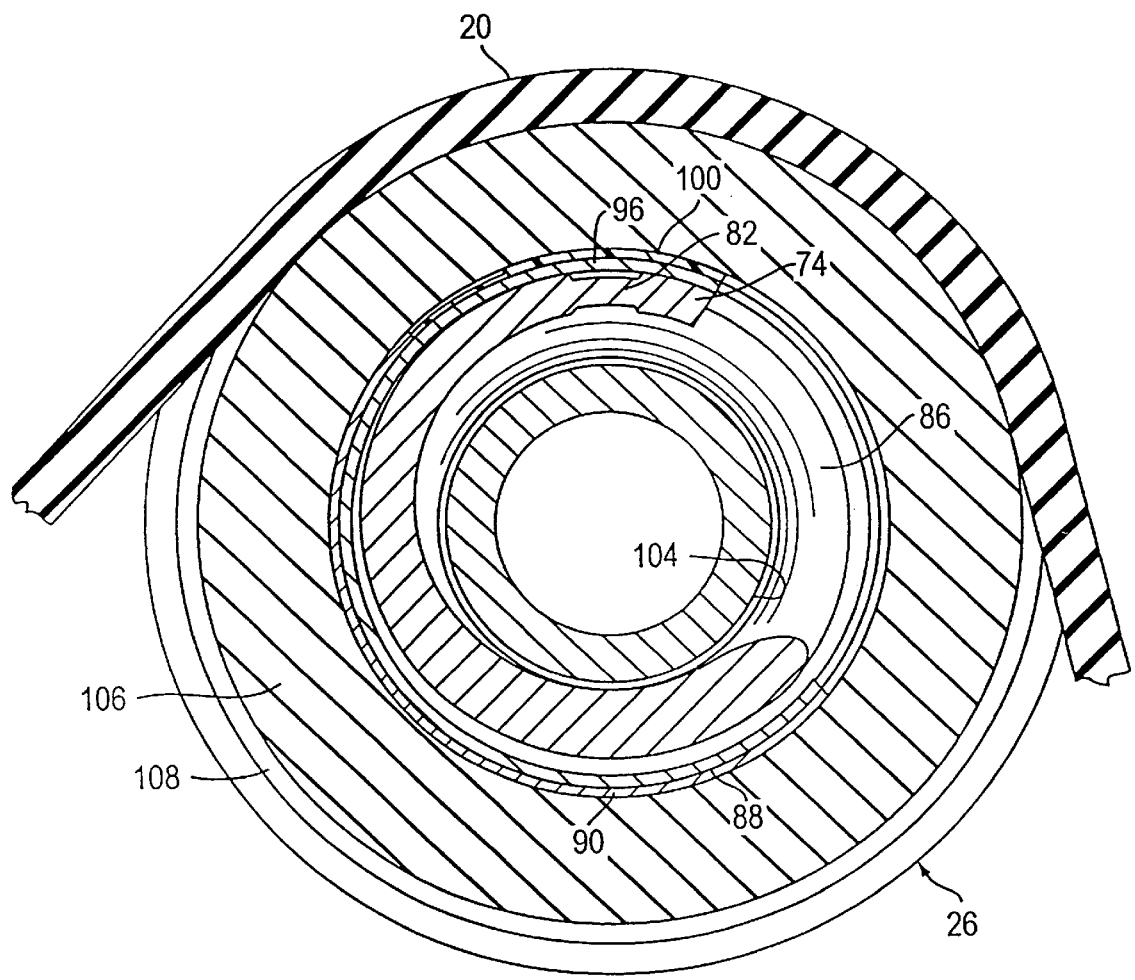
FIG. 3A is a sectional view taken along the line 3A—3A of FIG. 2.
Figure 3B:
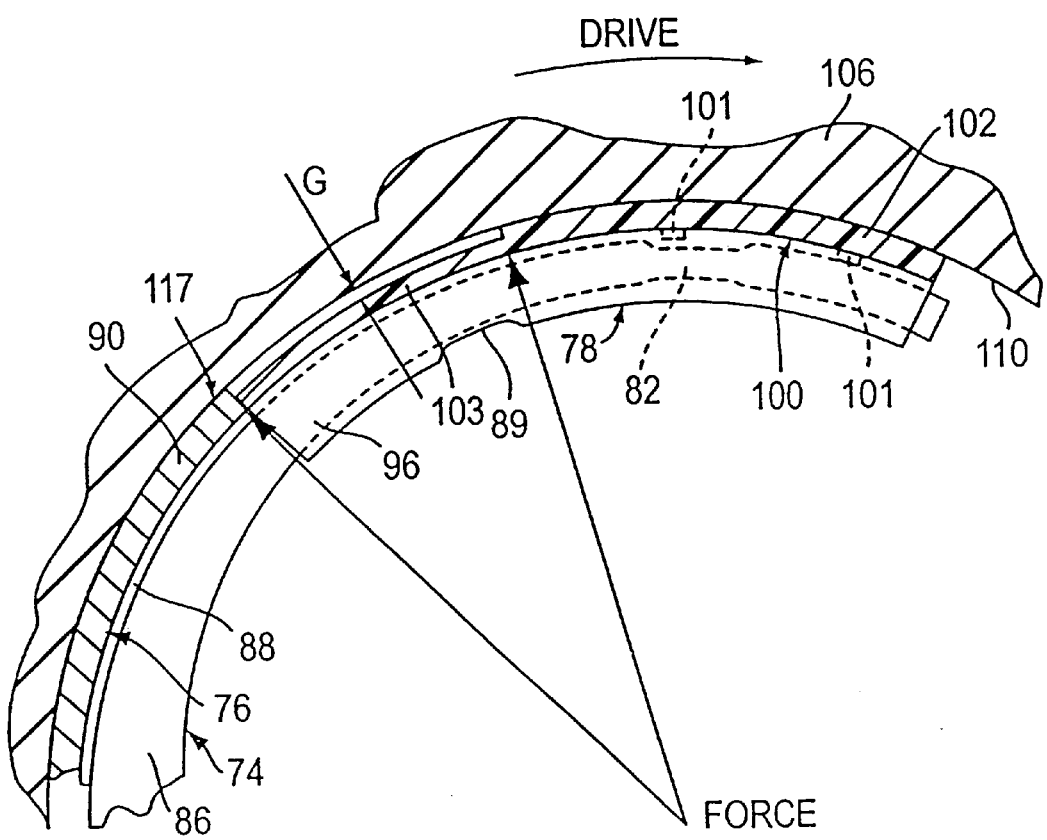
FIG. 3B is an enlarged fragmentary view partly in section showing the connection between the resilient decoupler spring and one-way clutch members of the present invention.
Figure 4:
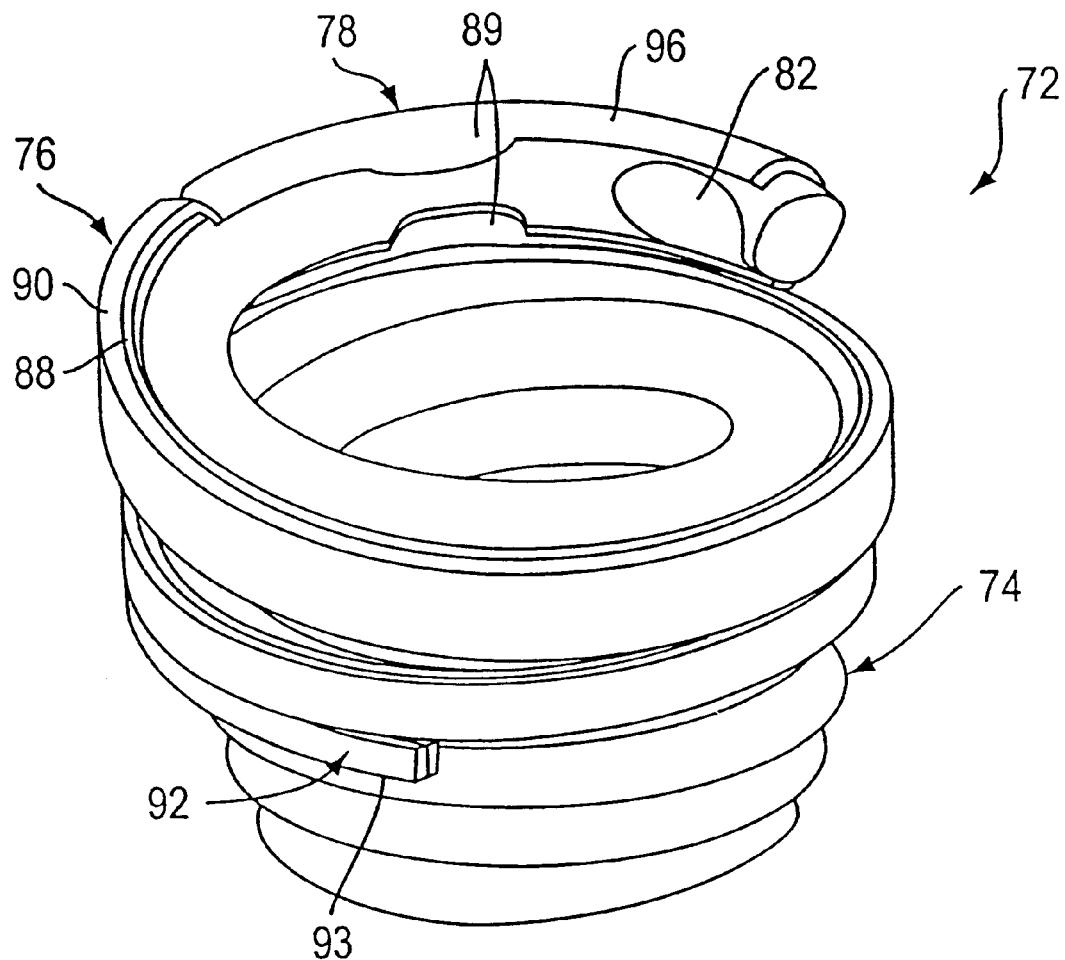
FIG. 4 is a perspective view of the resilient decoupler spring and one way clutch mechanism in accordance with the present invention.

As can also be appreciated from FIG. 4, at the connection 78 between the clutch element 76 and spring 74, the direction of the clutch coils reverse direction from the spring coils so that the clutch and spring are generally axially overlapping with respect to the axis of shaft 36. As can also be appreciated from FIGS. 3A and 3B, a plastic spacer segment 100 is snap-fit connected to the radially outer surface of the expanded width portion 96 of steel band 88 by virtue of a pair of prongs 101 which form an interference fit into respective holes in the expanded width portion 96. The plastic spacer segment 100 has an enlarged thickness portion 102 that extends in overlying relation with enlarged width and crimped portion 96 of steel band 88, toward the end portion of connection 78, where the steel band 88 and coil spring 74 terminate. The enlarged thickness portion 102 is sandwiched in surface contact between the outer surface of expanded width portion 96 and a cylindrical interior surface 110 of the pulley member 106 of alternator decoupler or pulley assembly 26. The plastic spacer 100 also has a stepped-down reduced thickness portion 103 integrally formed with the enlarged thickness portion 102 and extending to the adjacent end of the friction material 90. The reduced thickness portion 103 leaves a gap G between its radially exterior surface and the interior cylindrical surface 110 of pulley member 106. The gap G extends circumferentially between the end of friction material 90 and enlarged thickness portion 102 of spacer 100.

Both spring 74 and clutch 76 are preferably high tensile spring steel members, and the connection 78 between the two is particularly advantageous in performance as it permits the transmission of the required loads in both directions. An intermediate connecting member between the spring 74 and clutch 76 is also contemplated by the present invention to achieve further decoupling attributes, although this adds cost and weight. Although welding is possible with extensive treatment, it is not economically practical, and thus is not preferred.

The crimped portion 96 is forcibly press-fit by relative rotation similar in principal to a locking taper. Strength of the connection 78 is further enhanced by enhanced crimping at portion 89 behind the flattened portion 82 of spring 74 (see FIG. 4). The flattened portion 82 of spring 74 is flattened on opposite sides of the spring and provides that portion of the spring with a reduced diameter in the radial direction and an enlarged diameter in the axial direction (relative to the shaft axis). The enlarged diameter cross section at portion 82 enhances the strength of the tapered connection resulting connection is strong and robust and resistant to failure by fretting corrosion. The connection 78 provides a simple and economical method of attaching the two elements (spring and clutch).

Because the resilient member, for example coil spring 74, is formed separately from and connected to the one-way clutch 76 by an engineered and cost effective connection, flexibility in the choice of structure and materials for the resilient member and clutch can be achieved (e.g., dissimilar materials can be used for the one-way clutch and the resilient member).

Figure 5:
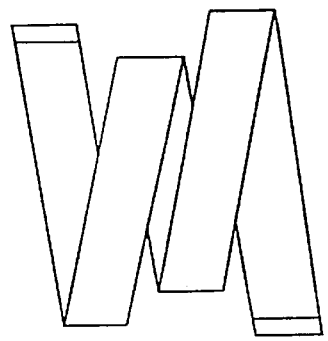
FIG. 5 is a side plan view showing an alternate configuration for the one-way wrap spring clutch mechanism of the present invention.

Referring to FIG. 5, it can be appreciated that the clutch coil diameters can be varied slightly in comparison with the clutch coil configuration shown in the embodiment of FIG. 2 to provide a stage-in effect whereby the angular distance of engagement can be varied from almost zero up to say 45 degrees. This feature proves very useful in preventing unwanted dis-engagement at low torque loads.

Referring back now to FIG. 2, it can be seen that an annular nylon thrust washer 98 is disposed between an annular edge of outer sleeve 64 of journal 63 and the edge surface 93 of a free end 92 of the wrap spring clutch element 76. It should be appreciated that the free end 92 of the clutch 76 has a slightly greater radius that the other clutch coils so as to be slightly pre-loaded into surface engagement with the interior surface 110 of pulley member 106.

As shown in FIG. 2, the annular pulley member 106 of decoupler or pulley assembly 26 has an exterior poly-V surface 108 for rollingly engaging the operative poly-V side of the serpentine belt 20. The interior annular surface 110 is disposed in engagement with an annular sleeve bushing 112, the interior of which is engaged with an exterior surface 114 of the outer sleeve 64. More specifically, bushing 112 is press-fitted into fixed relation with the interior surface 110 of pulley member 106, while the interior annular surface of bushing 112 is disposed in sliding friction relation with the exterior annular surface of over sleeve 64.

The outer race of a ball bearing assembly 118 is press fit to the interior annular surface 110 of pulley member 106, although other means of retention such as snap rings and retainers can be utilized to hold the assembly together. The ball bearing 118 is also press fit at its inner race onto the hub 52. This fitting arrangement holds the assembly in axial alignment.

Generally, the interior annular surface 110 of pulley member 106 will be of a singular diameter as illustrated. However, it may be necessary to step the diameters to accommodate particular design requirements.

The interior annular surface 110 of pulley member 106 serves also as the engagement surface for the one-way clutch system, see FIGS. 3A and 3B, specifically engaged by the brake (friction) material 90 attached to the band of coiled steel 88.

OPERATION

Referring to FIG. 2, the clutch 76 is manufactured with the first free coil 92 having a shaped end that serves in essence as a brake shoe. In the "drive" direction the first coil 92 or shoe serves to engaged pulley surface 110 by friction thus sequentially energizing all the remaining clutch coils.

In the "over-run" direction when the rotational velocity of the clutch (which is attached to armature 48) exceeds the velocity of the pulley, (torque is zero to negative), the braking effect is no longer functional and the clutch releases. The remaining forces are the sum of drag torques for the clutch 76, pulley member 106, bearing 118, and bushing 112.

It will be understood that, as long as there is a positive torque acting on the pulley member 106 by the movement of the belt 20, the resilient member and one-way clutch mechanism 72 will serve to transmit the movement imparted to the pulley member 106 by the belt 20 to the hub structure 52. During this driving movement (see drive direction arrow in FIG. 3B), the pre-loaded free end 92 of clutch 76 will virtually immediately frictionally engage and grip the interior annular surface 110 of the pulley member 106. Thus, initial gripping action is caused in part due to the fact that at least the free end of 92 clutch 76 has a natural (relaxed condition) outer diameter that is somewhat larger than the inner diameter of cylindrical surface 110. Thus, the first free coil 92 is biased into engagement with surface 110, with a gripping action provided by the initial portion of friction material 90. The gripping action is further enhanced by incrementally increasing portions of the clutch 76 being moved radially outwardly into engagement with surface 110 during the initial stages of driving movement. Because the gripping force is a function of the number of coil turns multiplied by the coefficient of friction, the gripping force of the clutch increases as more of the coils engage surface 110. It can thus be appreciated that the clutch 76 is "self energizing." It should also be appreciated that the increasing centrifugal force applied to clutch 76 causes radial expansion of clutch 76 into enhanced gripping engagement with surface 100. It should also be appreciated that the co-efficent of friction between the friction material 90 and steel surface 100 is preferably 0.25 or greater. In addition, it is preferred that the clutch 76 and friction material 90 thereof be provided with between 2–3 coil turns, and most preferably 2½ turns as shown in FIG. 4.

During this driving movement, the plurality of intermediate volutes 86 which are spaced between the inner 54 and outer 64 sleeves of the hub structure 52 enable the hub structure 52 and, hence, the alternator shaft 36 fixed thereto to be capable of instantaneous relative resilient rotational movements in opposite directions with respect to the alternator pulley 26 during the driven rotational movement thereof. In addition, when the rotational speed of the engine output shaft 14 is decelerated to an extent sufficient to establish a torque between the pulley member 106 and the hub structure 52 at a predetermined negative level, as, for example, minus 50 inch-pounds or less, the coils of clutch 76 will be disengaged from surface 110 and the friction material of the first coil 92 will engage the inner sleeve exterior peripheral surface 104 with a slipping action enabling the hub structure 52 and, hence, the shaft 36 or armature assembly 48 affixed thereto, to rotate at a speed in excess of the rotational speed of the pulley member 106. More particularly, as the torque acting through the helical torsion spring 74 drops toward zero, the forces acting on the one-way clutch are similarly relaxed.

In the immediate vicinity of zero torque, the conditions that originally engaged the clutch (brake shoe 92) become unfavorable for energizing the clutch assembly resulting in slippage between the clutch 76 and pulley surface 110. In this condition, the velocity of the alternator armature or rotor 48 will be greater than the velocity of the pulley member 106. The rotation of the clutch 76, and pulley 106 will be synchronous to the rotor 48.

The residual torque is the drag-torque or maximum negative torque that the pulley 106 will experience and thus impart to the belt 20.

The drag torque is the sum of the coefficient of friction between clutch friction material 90 with the pulley surface 110, the drag of ball bearing 118, and the drag between bushing 112 and outer sleeve 64.

Figure 6:
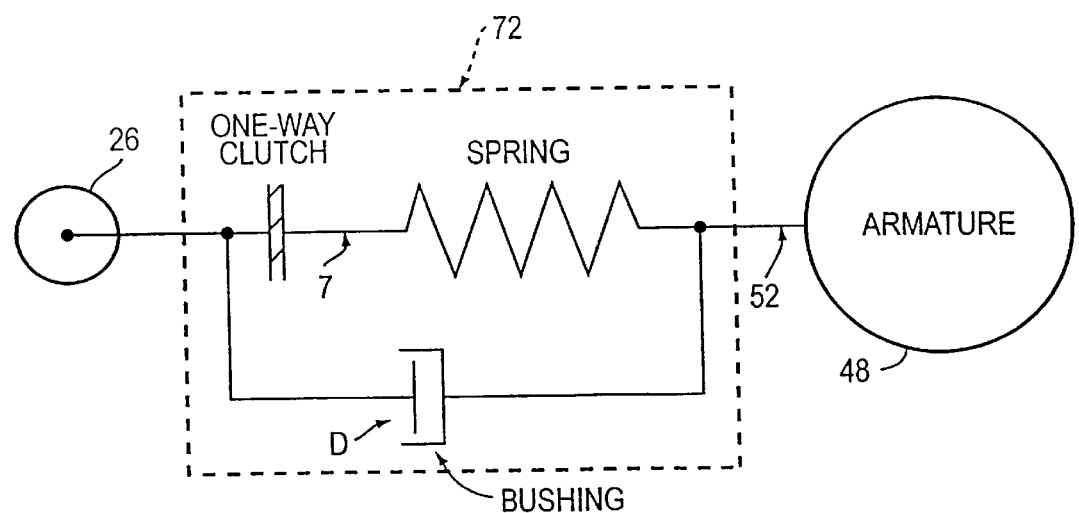
FIG. 6 is a schematic drawing representing the parallel damping effects that are achieved between the bushing and the in-series one-way wrap spring clutch element/torsional coil spring of the present invention.

These factors are all controllable by design to various extents. In particular, these residual torques can be used to limit excessive over-run speed differentials between the pulley member 106 and armature 48 that can create noise and excess heat. In addition, the residual torque provides damping that modifies the vibration control performance, i.e., modifies forces at resonance, etc. FIG. 6 is a schematic representation of how damping D works in parallel with the entire clutch/resilient member assembly 72.

Damping D, noted above, results primarily from the sliding frictional drag between the interior surface of bushing 112 and exterior surface of sleeve portion 64. It should be appreciated, however, that an alternative configuration contemplates that bushing 112 can be fixedly press fitted to sleeve portion 64, and that the exterior cylindrical surface of bushing 112 can be in sliding friction engagement with the interior surface of pulley 106 to provide the damping. It should also be noted while the ball bearing assembly 118 also provides some degree of damping, it only provides a small fraction of the damping provided by the bushing 112.

It is important to note that, in terms of function and durability, the clutch and friction drag factors must be varied so that over-run only occurs under two conditions with a normally functioning loaded serpentine belt system. First, when the engine is started and the system is in resonance, the clutch permits overrun to protect the spring 76 from excess reverse stresses. Second, the clutch also permits over-run when the engine is decelerated forcibly by a gear shift or strong deceleration that creates a negative torque between the rotor and pulley.

It is also important to note that the staged design of the clutch 76 illustrated in FIG. 5 can be used to prevent over-running under steady-state (idle) engine operation where the crankshaft 14 has a high rotational velocity, for instance in a rough diesel engine, and when the alternator torque load is very low. Under this condition, the torsion spring 74 may be almost fully relaxed. The clutch 76 is then utilized as a low-rate transitional spring that prevents overrunning or allows torque to fully reach zero. This design feature significantly improves the durability under such conditions.

The clutch can be thus configured so that it is "torque-sensing" for both directions within a given range.

The holding force of clutch 76, and also its releasing force, is affected by centrifugal force. In other words, because the friction material 90 is forced radially outwardly into engagement with surface 110 as a result of centrifugal force during the torque driving condition when the pulley 106 is used to transmit the belt load torque from belt 20 to hub structure 52, the gripping action of clutch 76 is enhanced. An advantage of the design is that by arrangement of the engaging surfaces, centrifugal forces enhance power capacity on acceleration and high speed, and provides increased braking power on over-run from high speeds.

It will be understood that the minus 50 inch-pound torque level previously discussed is exemplary only and that the negative torque level at which clutch slippage occurs is best chosen to fit the characteristics of a particular system. The system will vary depending upon the characteristics of (1) the engine; i.e., whether it is a "sporty" engine or a more conservative one which is computer controlled, and (2) the belt tension maintained by the belt tensioner 42 of the system. An exemplary belt tension for the 50 inch-pound, 2½" outer diameter alternator pulley 106 with 180 degree wrap is 70 pounds.

It should be noted that the configuration of the present invention provides a favorable drag/drive ratio. In other words, drag (which is the amount of frictional torque resistance during overrun) is relatively low so that the amount of wear is reduced. On the other hand, virtually no slippage occurs in the drive direction for virtually any size torque to be driven. Preferably, for two or more coil turns of the clutch 74, a drag/drive ratio of greater than 8:1 is provided. Most preferably with a co-efficeint of friction of 0.3 or greater between friction material 90 and surface 110, and at least two coil turns for clutch 74, the draft/drive ratio is greater than 40:1.

As shown in FIG. 1, it is desirable that the belt tensioner 42 operate on the belt 20 in the belt run leading to the alternator decoupler or pulley assembly 26. This enables the ability of the tensioner idler pulley 44 to move as the belt run is tensioned, due to a torque change to negative in the driving pulley 16, to accommodate to some extent the torque change between the belt 20 and the high inertial alternator decoupler or pulley 26 assembly. Moreover, the resiliency of the intermediate volutes 86 of the spring 74 provides additional accommodation. It will be understood that the resilient characteristics of the resilient member and one-way clutch mechanism 72 are tuned to the particular drive system and more particularly to the particular characteristic of the engine of the drive system. The strength of the spring 74 is determined by the diameter dimension of the steel wire utilized to form the coil. Proper tuning is determined by the spring rate which is a function of the extent of the intermediate volutes 86 or the number of turns or volutes included therein. Desirably, the predetermined negative torque level at which clutch slippage occurs is a final back-up accommodation for torque variation to negative which will prevent belt slippage with respect to the alternator decoupler or pulley assembly 26 with an attendant undesirable noise.

It should be understood that the predetermined negative torque level at which clutch slippage occurs is chosen by selecting the difference between the relaxed exterior diameter of the first plurality of clutch coils (beginning at free end 92) and the interior diameter of the cylindrical peripheral surface 110. The relationship is such that the diameter of surface 110 is smaller than the exterior diameter of the end clutch coils so that the end clutch coils (particularly end portion 92) are stressed during assembly. As the diameter difference is increased, the predetermined negative torque level is increased in a negative sense. Preferably, the predetermined negative level is chosen so the clutch slippage is minimized while insuring against belt-pulley slippage.

Figure 7:
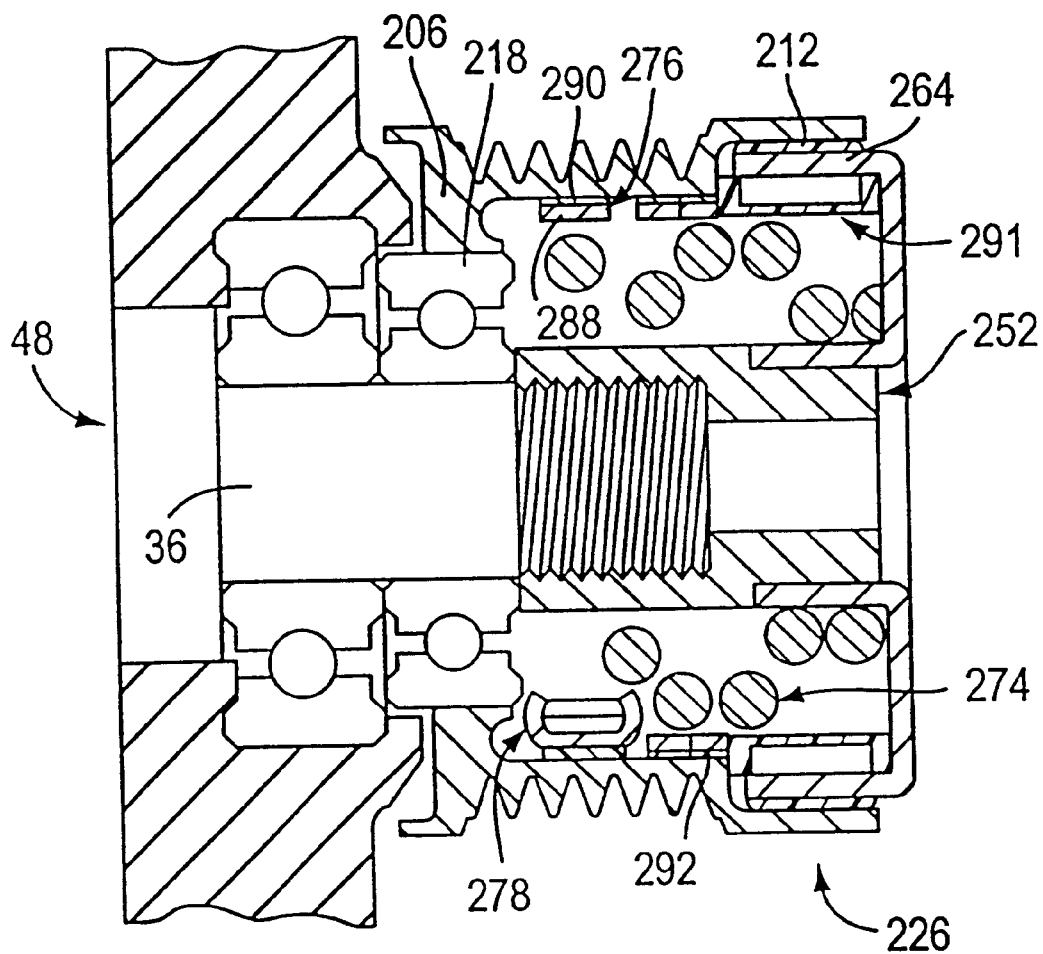
FIG. 7 is a cross sectional view of an alternate embodiment of the alternator decoupler in accordance with the present invention.

Referring now to FIG. 7, there is shown a pulley assembly 226 in accordance with a second embodiment of the present invention. The alternator decoupler or pulley assembly 226 works in conjunction with the engine 10 and drive system 18 of FIG. 1 and simply replaces the pulley assembly 26 in that Figure. The embodiment shown in FIG. 7 works in substantially the same fashion as the previous embodiment and has similar parts. For example, the pulley assembly 226 includes a pulley member 206, hub 252, journal 263 having sleeve portion 264, ball bearing assembly 218, resilient member in the form of coil spring 274, wrap spring one-way clutch 276 having steel coils 288 and friction material 290. The clutch 276 is connected to the spring 274 at crimped connection 278. Also included as an annular thrust washer 291 which serves to support the free end 292 of the clutch and keep the clutch free end in place against the force of axial side loads tending to force the end 292 axially outwards. The main difference between the embodiment shown in FIG. 2 and the embodiment of FIG. 7 is the location of the decoupler ball bearing assembly (reference numeral 118 in FIG. 2 and reference numeral 218 in FIG. 7) and bushing/sleeve members (112, 64 in FIG. 2, and 212, 264 in FIG. 7). In particular, in the embodiment of FIG. 2, the ball bearing assembly 118 is positioned towards the front end of the alternator pulley 26, spaced away from the alternator armature 48, while the bushing 112 and sleeve 64 are positioned towards the rear end of the pulley 26, closer to the alternator armature 48. In this embodiment of FIG. 2, the bushing 112 and sleeve 64 receive most of the bending moment applied by the belt 20 to the alternator shaft 36. In this configuration, more of the belt load is carried by the bushing 112 and sleeve 64 in comparison to the amount of load carried by bearing 118. This configuration is best suited for higher damping requirements.

In the embodiment of FIG. 7, the ball bearing assembly 218 is positioned towards the rear end of the alternator pulley assembly 226, closer to the alternator armature 48 than the bushing 212 and sleeve 264, which are disposed at the forward end of the pulley. In this arrangement, the ball bearing assembly 218 carries the majority of the bending moment of the alternator shaft 36 and is particularly beneficial for torsionally rougher applications and where less damping is required.

In accordance with the invention, the configuration of the generally helical coil of spring steel 74 or 274, and the wrap spring clutch element 76 or 276 collectively results in a coil spring/one-way clutch that provides mutual protection for both the coil spring (74, 274) as well as the wrap spring clutch element (76, 276). In particular, because the wrap spring clutch element (76, 276) has enhanced gripping action in comparison with previous designs, the wrap spring clutch efficiently and immediately grabs the inner sleeve during the drive condition when the coil spring and one-way clutch mechanism serves to transmit the movement imparted to the pulley member 106, 206 by the belt 20 to the hub structure 52, 252. The enhanced gripping action of the clutch element 76, 276 provides virtually no slippage in the drive condition and relieves the wear that would be present in an arrangement in which spring steel is used for the clutch, as in U.S. Pat. No. 5,156,573. In addition, the configuration of the torsion spring 74, 274 and the wrap spring clutch element 76, 276 also results in the wrap spring clutch element 76, 276 providing protection for the elastic spring element 74, 274 during the over-run condition by protecting the spring 74, 274 from reverse tensions. On the other hand, the coil spring 74, 274 protects the wrap spring clutch element 76, 276 by undergoing self-oscillations during the drive condition or reversals to relieve stress on the wrap spring clutch.

Preferably, the elastic spring element 74, 274 is a relatively "soft" spring, which can be used because the clutch mechanism 76, 276 will release to protect the spring during system shut down. Because a softer spring is used, the drive frequency can be reduced to preferably less than 75% of the idle frequency. For example, where the idle frequency fires at 30 Hz, the drive frequency can fire at as little as 15 Hz, which is 50% of the drive frequency. The drive frequency is preferably between 50%–75% of the idle frequency. In this arrangement, spring resonance is at lower speeds, and only occurs during shut down and/or start up. The clutch works to protect the spring during resonance.

There are four primary operations associated with the resilient member and one-way clutch mechanism 72, 272 including operation while at rest, operation during acceleration, operation at constant velocity, and operation during deceleration. This will be described by reference to the first embodiment as shown in FIG. 2. It should be appreciated, however, that other principles of operation apply equally to other embodiments, such as the embodiment of FIG. 7.

Operation While at Rest

At rest, the spring element 74 is at zero stress and torque. There is no rotational motion imparted through the pulley 26 which is also at rest when the engine is at rest. The wrap spring clutch element 78 remains slightly preloaded radially outwardly into engagement with surface 110 due to the combination of the material characteristics and the construction, but there are no moving frictional surfaces at this time.

Operation During Acceleration

When the pulley 26 is rotated by the application of a driving belt force, the wrap spring clutch element 76 immediately engages at free end 92 by means of the friction created through the surface contact of material 90 at the first clutch coil 92. The geometry of the spiral multiplies the holding force which facilitates torque transfer through to the elastic or resilient member, preferably in the form of spring element 74. As the load applied increases, the elastic spring element 74 will deflect by a corresponding amount until equilibrium is reached. Centrifugal forces enhance the holding ability of the clutch 76 as the ability to grip is a function of the number of turns of the clutch making contact with driving surface 110 and the coefficient of friction between friction material 90 and surface 110. The expansion of the spring 74 towards the inside of the hub 52 creates forces which strengthen the gripping action as acceleration continues to take place.

If the driving pulley 26 continues to accelerate, the torque load increases substantially while the torsional fluctuation is minimal. The clutch 76 will transmit the load to the spring 74 causing the spring 74 to deflect further in one direction while working to maintain dynamic equilibrium.

Incorporation of the plastic spacer member 100 controls the alignment of the spring 74 and limits the ultimate amount of deflection possible. More importantly, the space member 100 axially balances the spring 74 by opposing the tipping force applied by the spring which is effected by the tangential force applied by the friction material 90 in the drive condition. Because there is no relative motion between the plastic space 100 and the pulley member 106 in the drive condition, there is relatively little wear on the surfaces in comparison with alternate arrangements, for example, wherein the plastic piece is positioned on the inside of the spring.

By providing gap G (as shown in FIG. 3) between the thick portion 102 of the plastic spacer member 100 and friction material 90, the space member 100 permits the end portion 117 of friction material 90 (opposite the free end 92) to be driven radially outwardly into frictional engagement with the surface 110 of pulley member 106 in the drive direction. Without the formation of Gap G, the space 100 may otherwise cause a substantial portion of the last clutch coil 117 to remain out of engagement with the surface 110 when driving the spring 74 and subject this portion 117 of the clutch to significant flexing and weakening.

Operation at a Constant Velocity

Under a steady state nominal speed with fluctuations due to torsional vibrations, the spring 74 will deflect as the torque fluctuates. This always occurs in the positive stress region of the spring's working range. The net effect is to isolate the majority of the torque transfer between the input and output elements of the device. Absorbed energy is dissipated in the form of heat. While operating at a constant velocity, the clutch 76 remains stationary to the pulley member 106. During this mode, the clutch 76 is rotating at the same velocity as the driven alternator shaft pulley member 106.

Operation During Deceleration

When deceleration of the drive belt 20 occurs, such as deceleration or engine stoppage, the inertia of the alternator will resist changing speed. The alternator armature mass resists velocity change and puts large stresses on the belt system. As the rotational velocity of the pulley 26 decreases below that of the driven rotor or armature mass (relative negative torque), the spring 74 will return to an unloaded condition and continue to be driven in the negative direction. At this point, the conditions for clutch operation become unfavorable and the torque transfer capability is minimal. The armature is now free to over-run with a slight frictional drag at the clutch coil free end 92 until the relative velocities between the input and output shafts become positive. As the clutch 76 is not able to transmit torque, the spring 74 remains substantially stress-free.

Because the present invention temporarily removes the inertia from the system under conditions of drive belt deceleration, system durability is improved and a small improvement in overall fuel efficiency maybe achieved. By controlling excess torsional vibration and permitting the over-run of inertia during speed changes and engine shut downs, the resilient member and one way clutch mechanism embodied in the present subject matter provides improved system durability and fuel economy.

ADDITIONAL EMBODIMENTS

Each of the following embodiments illustrate other alternator decouplers which provide separate spring and clutch members which are connected in series to transmit rotation between the alternator pulley member and mounting hub. In each instance, these alternator decouplers or pulley assemblies can be placed on the alternator shaft 36 of FIG. 1 in place of the pulley assembly 26 illustrated in that Figure.

Figure 8A:
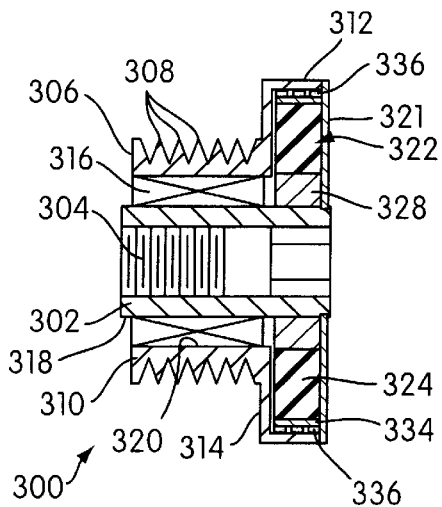
FIG. 8A is a cross-sectional view of a third embodiment of an overrunning alternator decoupler in accordance with the principles of the present invention.

FIG. 8A is a cross-sectional view of a third embodiment of an alternator decoupler pulley assembly in accordance with the principles of the present invention. In FIG. 8A, the alternator decoupler assembly is generally indicated at 300. The decoupler assembly 300 has a sleeve member 302 having internal threads 304 that enable the sleeve 302 and entire decoupler assembly 300 to be fastened onto the end of an alternator drive shaft. The sleeve member 302 is fixed for rotation with the alternator shaft.

A poly-V belt pulley member 306 is mounted over the sleeve 302. The pulley member 306 has a plurality of alternating ribs and grooves 308 constructed and arranged to engage the grooves and ribs of a poly-V belt. In a preferred embodiment, six grooves are provided for engaging six ribs of a belt. For a belt having six ribs and grooves, the preferred belt width is approximately 25 mm. In alternate preferred arrangements, the belt has five, seven, or eight ribs and hence, the pulley 306 would have a corresponding number of grooves.

The ribs and grooves 308 are provided on a relatively narrowed diameter portion 310 of the pulley member 306. The distal or front end of the pulley member 306 (i.e. the end of the pulley member which is furthest away from the alternator or engine block) has an enlarged diameter portion 312 forming a cylindrical wall. A radially outwardly extending wall portion 314 connects the enlarged diameter portion 312 with the narrowed diameter portion 310.

A bearing member 316 is disposed between an exterior cylindrical surface 318 of the sleeve member 302 and the cylindrical interior surface 320 of the narrowed diameter portion 310 of the pulley member 306. During the appropriate overrunning condition, the bearing member 316 permits relative rotation between the pulley 306 and the sleeve member 302.

The bearing 316 may simply be a bushing, similar to the bushing 112 shown in the first embodiment. It is contemplated that where the bearing member 316 is in the form of a bushing, a powder metal or polymer substance can be used, with the polymer substance being preferred for most applications. In applications where a higher degree or frequency of overrunning is anticipated, powder metal may be preferred because it exhibits better qualities and characteristics for high speed spinning of the pulley, and at the same time exhibits adequate capabilities for small oscillations of the pulley. Powder exhibits superior qualities for high speed spinning, as it contains oils or lubricating components in its composition to provide a naturally lubricated bearing member.

Polymer bushings are usually preferred, as they are more resistant to wear over long periods of oscillation.

Alternately, it is contemplated that the bearing member 316 may be in the form of a needle bearing. A conventional needle bearing having an inner and outer race can be used. Alternately, the sleeve 302 may have an inner race machined or otherwise formed on the exterior surface 318 thereof, so that the needle bearing member may simply comprise a needle member and outer race press fitted over the sleeve 302.

In the embodiment shown in FIG. 8A, the enlarged diameter portion 312 is closed-off at the front end thereof by a annular disk member 321 which is fixed at its exterior periphery to the edge of enlarged diameter portion 312, and fixed at its interior edge to the exterior surface 318 of sleeve member 302. The disk member 321 cooperates with the enlarged diameter portion 312 to define a housing for a resilient member and interconnected one-way clutch mechanism, generally indicated at 322.

In this embodiment, the resilient member and connected one-way clutch mechanism 322 comprises a resilient member in the form of a compression type rubber spring structure 324. As can be appreciated from FIG. 8B, the rubber spring structure 324 comprises a plurality of radially extending spoke-like members 326. The spring members 326 are fixedly mounted on a hub structure, generally indicated at 328. The hub structure 328 that is made of a metal material, such as steel, and has an interior surface thereof rigidly fixed to the exterior of metal sleeve 302. The hub structure 328 may be connected to the sleeve member 302 in any conventional fashion, such as being press fitted or welded thereto.

The hub structure 328 has a generally cylindrical cross-sectional portion 330, and a plurality of integrally formed mounting portions 332 which combine to provide a generally square peripheral cross-sectional configuration. The flat peripheral surfaces 333 defining the squared cross-sectional configuration serve as mounting surfaces for the radially inner portions of the spring members 326. The spring members 326 may be fixed to the flat surfaces 333 of the mounting portions 332 and any conventional fashion such as being vulcanized thereto. When a pulley member is rotated in the drive direction (See arrow in 8B) by an associated belt, the spring members are compressed inwardly onto the mounting surfaces 333 of the hub structure 328 and rotates the hub structure, which in turn sets the sleeve 302 and alternator shaft in motion.

The radially outer or peripheral surfaces of the spring members 326 are vulcanized or otherwise fixed to an annular carrier plate 334 made of a metallic material, such as steel or aluminum. Mounted between the carrier plate 334 and the cylindrical interior surface of the enlarged diameter portion 312 is a clutch assembly 336. Preferably, the clutch assembly 336 is of the type disclosed in U.S. patent application Ser. No. 08/817,799 hereby incorporated by reference. In addition, preferably the carrier plate 334 in accordance with the present invention comprises an annular band which is similar to the band which comprises the circumferential surface of the carrier plate disclosed in the aforementioned application Ser. No. 08/817,799.

Figure 19:
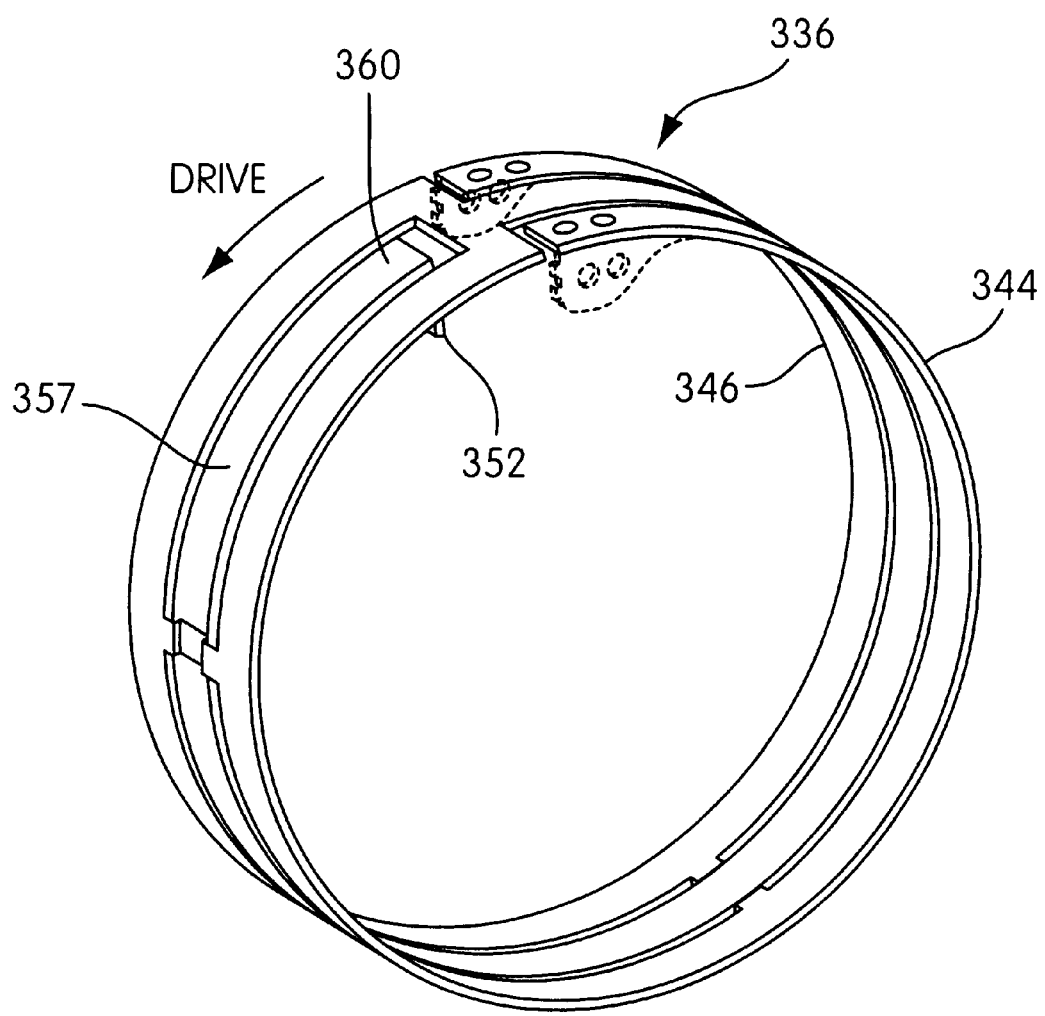
FIG. 19 is a perspective view of a clutch assembly utilized in accordance with the principles of the present invention.
Figure 20:
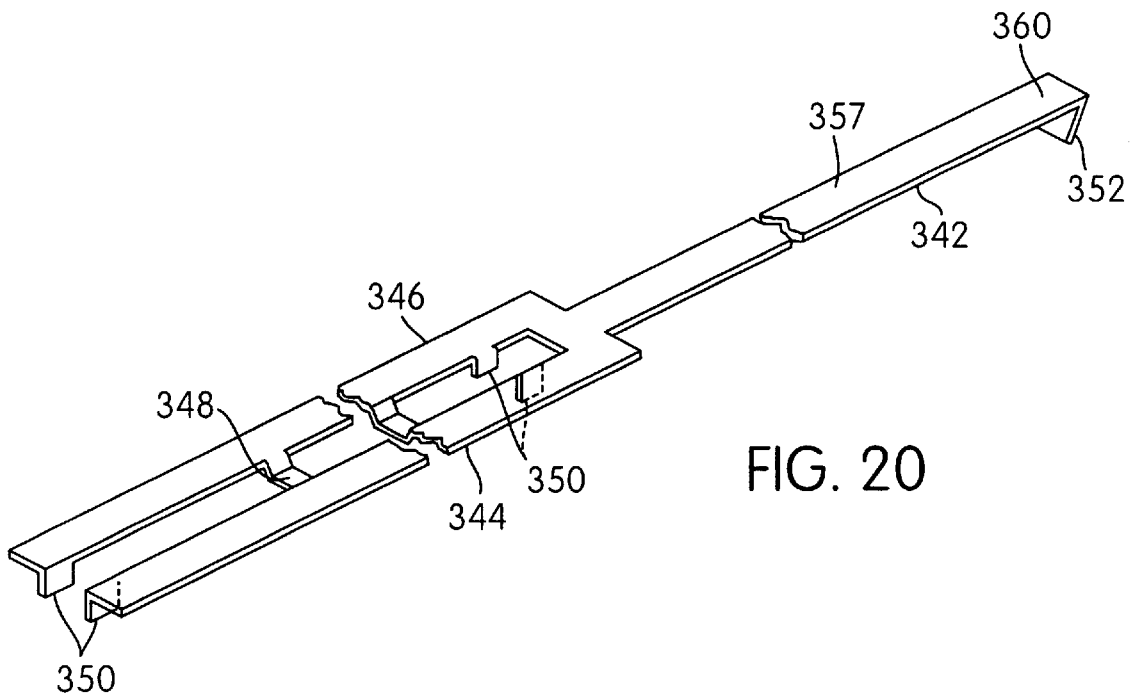
FIG. 20 is a perspective view of the clutch assembly shown in FIG. 19, with the clutch member being in an unwound or disassembled configuration.
Figure 21:
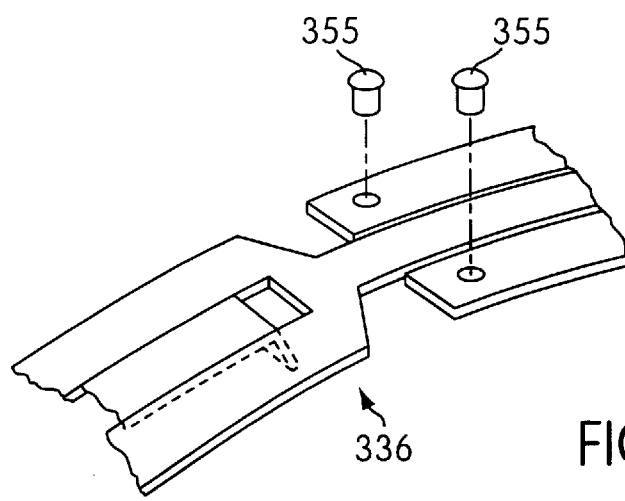
FIG. 21 is an enlarged partial perspective view of the clutch assembly of FIG. 19, illustrating the interfacing portions in an assembled condition.

Referring to FIGS. 19, 20 and 21, the clutch assembly 336 comprises a single band portion 342 joined to two parallel bands 344 and 346. Bands 344 and 346 are joined together by a bridge 348 for stabilizing the bands 344 and 346. Bands 344 and 346 also have tabs 350 for centralizing the band on the circumferential exterior surface of carrier plate 334.

As can be appreciated from the aforementioned application Ser. No. 08/817,799, the circumferential exterior surface of carrier plate 334 has a circumferential slot for receiving an end tab 352 disposed at the end of single band portion 342 and extending radially inwardly. Band 342 is lapped over bridge 348, as can be appreciated from the figures.

In the present invention, it is preferred that the clutch assembly 336 be made from spring steel and have an exterior surface 357 made from a friction material, just as in the first two embodiments. In this manner, a free end 360 of the single band portion 342 is pre-loaded in a radially outwardly biased direction for frictional engagement with the interior cylindrical surface of the enlarged diameter portion 312. When the pulley member 306 is rotated by the belt, the pulley 306 is rotated in the drive direction as indicated by the arrow in FIG. 19. Rotation of pulley member 306 in this direction causes the cylindrical interior surface of enlarged diameter portion 312 to immediately frictionally engage the free end 360 of clutch assembly 336. The clutch assembly 336 then "self-energizes" as increasing portions thereof frictionally engage the cylindrical interior surface of enlarged portion 312, until the entire exterior friction material surface 357, including the parallel band regions 334, 346 is in frictional engagement. Bands 344 and 346 are connected to circumferential exterior surface of the carrier plate 334 by using rivets 355. Other suitable fasteners such as nuts and bolts may also be used.

In an alternate embodiment, and as disclosed in said application Ser. No. 08/817,799, the clutch assembly 336 need not comprise radially outwardly biased spring material in order for the free end 360 to be pre-loaded in frictional engagement. Rather, a spring (such as a coil spring) can be connected with the free end 360 (e.g., between the free end the carrier plate) to bias the free end into a pre-loaded condition against the interior surface of enlarged diameter portion 312. By biasing the clutch assembly with a pre-loading spring, as with previous embodiments, bands 342, 344 and 346 will slide when moved relative to the interior surface of portion 312 in one direction, and will frictionally engage this surface when slid in the opposite direction. In this manner, the one-way clutch will transmit torque from the pulley member 306 to the alternator during the belt drive condition, but will slide relative to the pulley during the overrun direction.

Figure 9A:
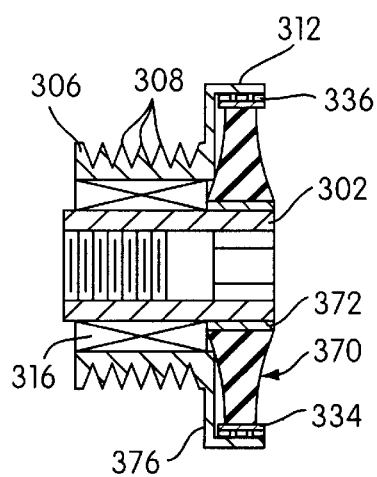
FIG. 9A is a cross-sectional view of a fourth embodiment of an overrunning alternator decoupler in accordance with the principles of the present invention.
Figure 9B:
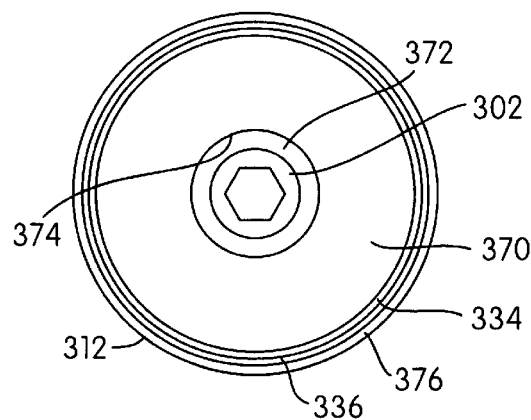
FIG. 9B is a front plan view of the alternator decoupler shown in FIG. 9A, with certain portions removed to better reveal others.

Shown in FIG. 9A is a fourth embodiment of an alternator decoupler in accordance with the present invention. Identical parts are indicated with the same reference numerals as shown in 8A and 8B. The primary difference between the arrangement shown in FIG. 9A in comparison with that of FIG. 8A is the use of a shear type rubber spring member 370 in place of the compression type rubber spring structure 324. The shear type rubber spring 370 has its radially inner annular surface 374 vulcanized or otherwise fixed to the exterior periphery of an annular sleeve member 372, which is in turn fixed to the exterior cylindrical surface of the sleeve 302.

Figure 8B:
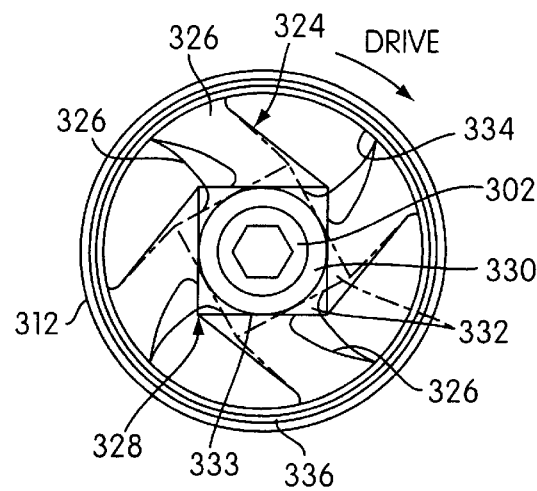
FIG. 8B is a front plan view of the alternator decoupler shown in FIG. 8A, with certain portions removed to better reveal others.

A peripheral surface 376 of the shear spring 370 is vulcanized or otherwise fixed to the carrier plate 334 which is identical to the carrier plate discussed in the embodiment with respect to FIGS. 8A and 8B.

In the at rest condition, the rubber shear spring 370 is compressed between the inner sleeve member 372 and the outer carrier plate 334.

A clutch spring assembly 336 as discussed previously is fixed to the carrier plate 334 and is constructed and arranged to establish frictional engagement with the inner cylindrical surface of the enlarged diameter portion 312. Driven rotation of the pulley 306 is transmitted through the clutch assembly 336 and shear spring 370 to the alternator shaft via sleeve member 302.

Figure 10A:
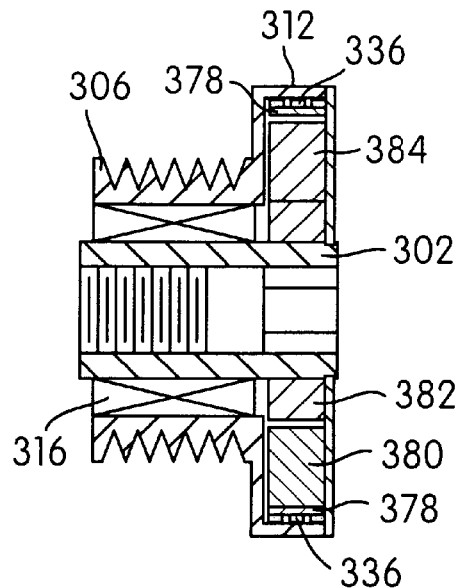
FIG. 10A is a cross-sectional view of a fifth embodiment of an overrunning alternator decoupler in accordance with the principles of the present invention.
Figure 10B:
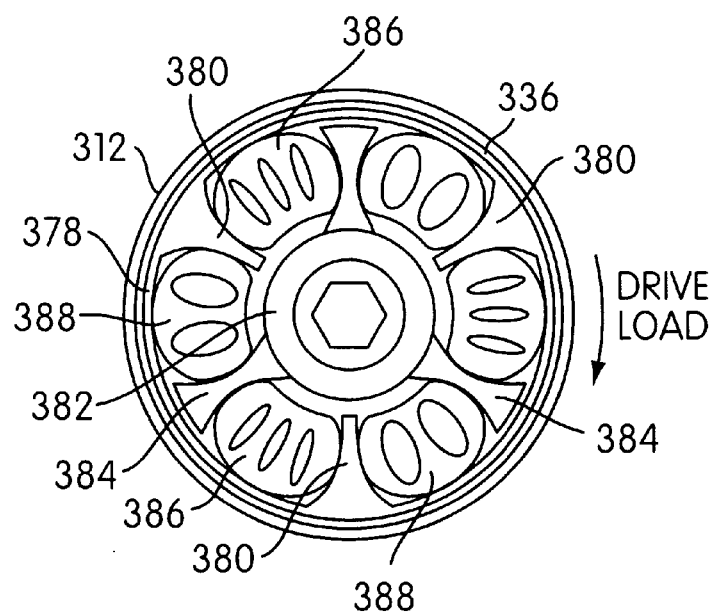
FIG. 10B is a front plan view of the alternator decoupler shown in FIG. 10A, with certain portions removed to better reveal others.

Shown in FIGS. 10A and 10B is a fifth embodiment in accordance with the principles with the present invention. In FIGS. 10A and 10B, a plurality of compression block-typed rubber springs 386, 388 are used as the resilient member which connects the one-way clutch 336 with the inner sleeve 302 and hence the alternator shaft. In this embodiment, a carrier plate 378 is modified in comparison with the carrier plate embodiment shown in FIGS. 8A, 8B, 9A and 9B. In particular, the carrier plate 378 adds or incorporates a plurality of radially inwardly extending projections 380 from evenly spaced circumferential positions from the radially interior surface of the carrier plate periphery. The carrier plate 378 and projections 380 thereof is preferably made of steel as an integral structure.

Fixedly mounted on the sleeve 302 is an annular hub member 382. A plurality of radially outwardly extending projections 384 extend from evenly spaced circumferential positions on the exterior surface of the hub member 382. Preferably, the projections 384 are made from steel and integrally formed with the hub member 382 although they may be provided separately and fixed to the hub member 382.

The projections 380 extending from the carrier plate 378 and the projections 384 extending from the hub member 382 are alternately arranged in a circumferential direction. A plurality of compression block-type coupling drive springs 386 are provided between the projections 380 and projections 384, when viewed in FIG. 10B moving from the projections 380 to the projections 384 in clockwise direction. In FIG. 10B, the pulley member 306 and hence the enlarged diameter portion 312 thereof is driven by the belt in a clockwise direction. The clutch assembly 336 transmits the rotation from the enlarged diameter portion 312 to the carrier plate and hence projections 380 thereof. The clockwise rotational movement is imparted through the drive springs 386 to the projections 384 extending from the hub member 382. It can thus be appreciated that clockwise rotation of the pulley member 306 is imparted through to the sleeve 302 and the alternator shaft fixed thereto. In the condition shown, the drive springs 386 are in an compressed condition between the projections 380 and 384.

When extending from the projections 384 to the projections 380 in a clockwise direction, there is shown a plurality of overrun compression spring members 388. These spring members 388 are shown in a relaxed condition in FIG. 10B, but will be compressed in the circumferential direction during the overrun condition when the alternator shaft is rotating faster than the pulley member 306 and the clutch slides relative to enlarged diameter portion 312.

The spring members 386 and 388 need not be fixed to the projections 380 and 384 on opposite sides thereof, but having the rubber springs fixed to the projections is preferred.

Figure 11A:
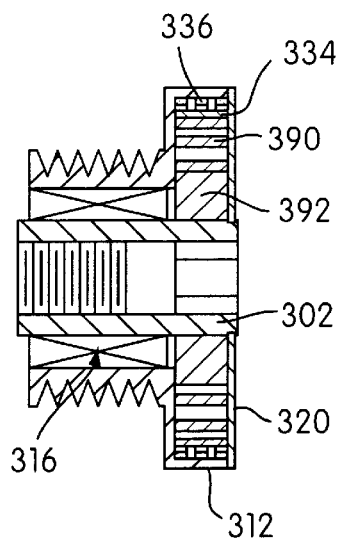
FIG. 11A is a cross-sectional view of a sixth embodiment of an overrunning alternator decoupler in accordance with the principles of the present invention.
Figure 11B:
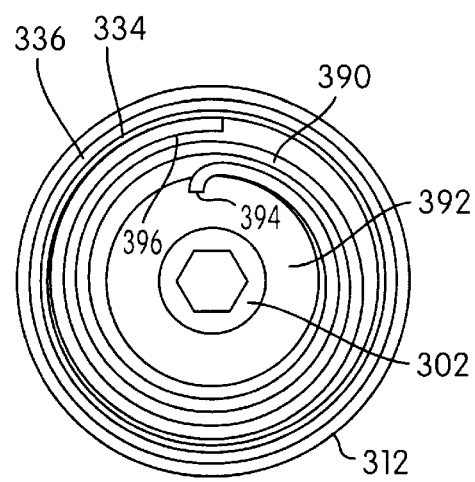
FIG. 11B is a front plan view of the alternator decoupler shown in FIG. 11A, with certain portions removed to better reveal others.

Shown in FIGS. 11A and 11B is a sixth embodiment in accordance with the principles of the present invention.

The embodiment shown in FIGS. 11A and 11B differs from the embodiments shown in FIGS. 8A, 8B, 9A, and 9B, primarily in that a torsion flat wire spring 390 is used in place of the rubber springs. The spring 390 is spirally wound about annular hub 392. A radially inner end 394 of the spring 390 is fixed in any conventional fashion to the hub 392. The hub 392 has a radially inner cylindrical surface thereof fixed to the sleeve 302.

The radially outer end portion 396 of spring 390 is fixed to the carrier plate 334 discussed above with respect to FIGS. 8A–9B. The end portion 396 may be fixed to the carrier plate 334 by rivets, welding, etc. The carrier plate 334 and clutch assembly 336 function as noted previously.

Figure 12A:
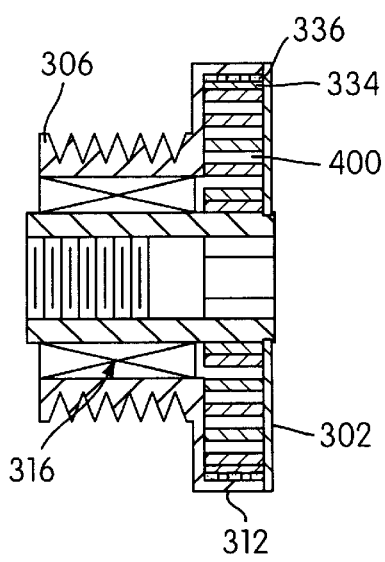
FIG. 12A is a cross-sectional view of a seventh embodiment of an overrunning alternator decoupler in accordance with the principles of the present invention.
Figure 12B:
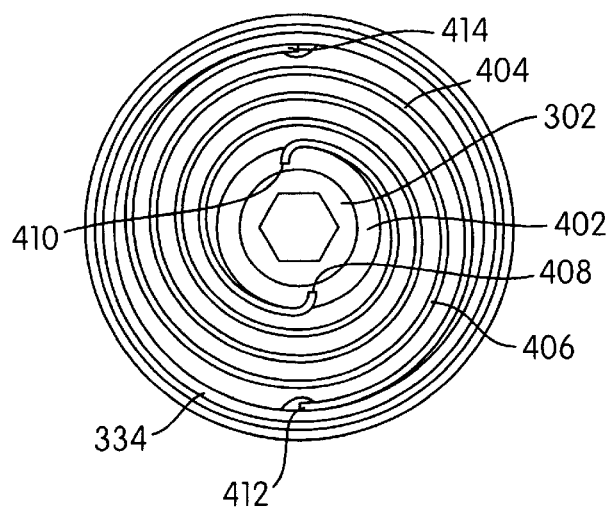
FIG. 12B is a front plan view of the alternator decoupler shown in FIG. 12A, with certain portions removed to better reveal others.

Shown in FIGS. 12A and 12B is a seventh embodiment in accordance with the principles of the present invention. This embodiment is substantially similar to that shown in FIGS. 11A and 11B, except for the use of a double torsion flat wire spring assembly 400 being substituted for the single flat wire spring 390. Central hub 402 is fixed about the sleeve 302 as noted above with respect to FIGS. 11A and 11B. In this embodiment, however, the spring assembly 400 comprises a first spirally wound flat wire spring member 404, and a second spirally wound flat wire spring member 406. First spring member 404 has a radially inner end 408 thereof fixed to the hub member 402, while the second spring member 406 has a radially inner end 410 thereof fixed to the hub member 402. The fixed ends 408 and 410 are connected at circumferentially spaced locations at approximately 180° from one another as shown.

A radially outer end 412 of the first spring 404 is fixed (e.g., by rivets) to the radially interior surface of the carrier plate 334. Similarly, the radially outer end 414 of the second spring member 406 is fixed to the radially inner surface of the carrier plate 304 in any conventional fashion. The connected ends 412 and 414 of the respective spring members 404 and 406 are connected with the radially interior surface of carrier plate 334 at circumferentially spaced locations, approximately 180° C. from one another.

An advantage with respect to the embodiment of FIGS. 12A and 12B is that the two opposing springs 404, 406 provide a self-balancing effect which tends to eliminate the inherent unbalance of all single metal spring designs.

Figure 13A:
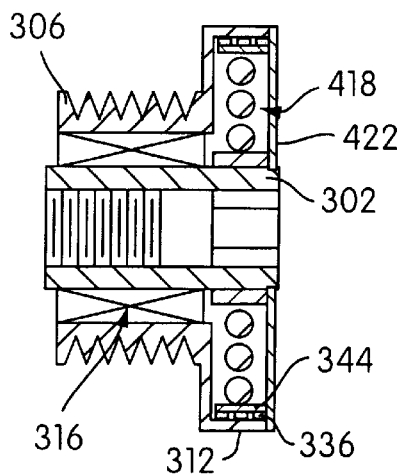
FIG. 13A is a cross-sectional view of an eighth embodiment of an overrunning alternator decoupler in accordance with the principles of the present invention.
Figure 13B:
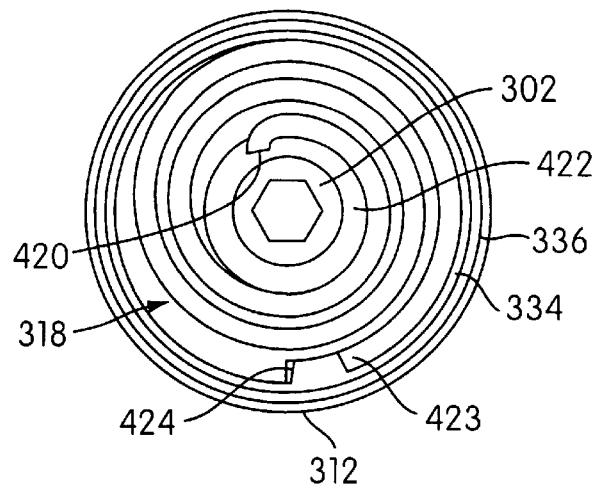
FIG. 13B is a front plan view of the alternator decoupler shown in FIG. 13A, with certain portions removed to better reveal others.

Shown in FIGS. 13A and 13B is a thirteenth embodiment in accordance with the principles of the present invention. This embodiment is substantially similar with the embodiment shown in FIGS. 11A and 11B except that a torsion wire spring having a circular cross-sectional configuration is used instead of the flat spring 390. The wire spring, generally indicated at 418, has its radially inner end 420 fixed to a central hub 422. The central hub 422 is, in turn, fixed about the central sleeve 302.

The embodiment shown in FIGS. 13A and 13B also differs in that the radially outer end portion 423 of the resilient spring 418 is fixed to the carrier plate 334 by a crimped connection 424 similar to the connection 78 discussed with respect to the first disclosed embodiment. While welding this outer end 423 to the carrier plate 334 is possible, it is preferred to utilize the crimped connection 424 so as to receive similar benefits to those which accrue with the connection 78. It is also preferred for the outer end portion 423 to be provided with the flattened portion 82, and for the carrier plate to have enhanced crimped portions 89 as can be appreciated from FIG. 4.

The embodiments shown in FIGS. 8–13 are advantageous because the use of the enlarged diameter portion 312 enables a greater radius for the clutch assembly 336 relative to the diameter of the belt engaging portion or narrowed diameter portion 310 of the pulley member 306. Because the clutch assembly 336 is provided with a greater radius, less coils or wraps of the clutch are required to frictionally engage and grip the inner surface of portion 312 to drive the same amount of alternator shaft torque in comparison with the amount of coils or turns required for a clutch of lesser radius. Where fewer coils or turns of the clutch are required, manufacturing of the assembly is made simpler.

Figure 14:
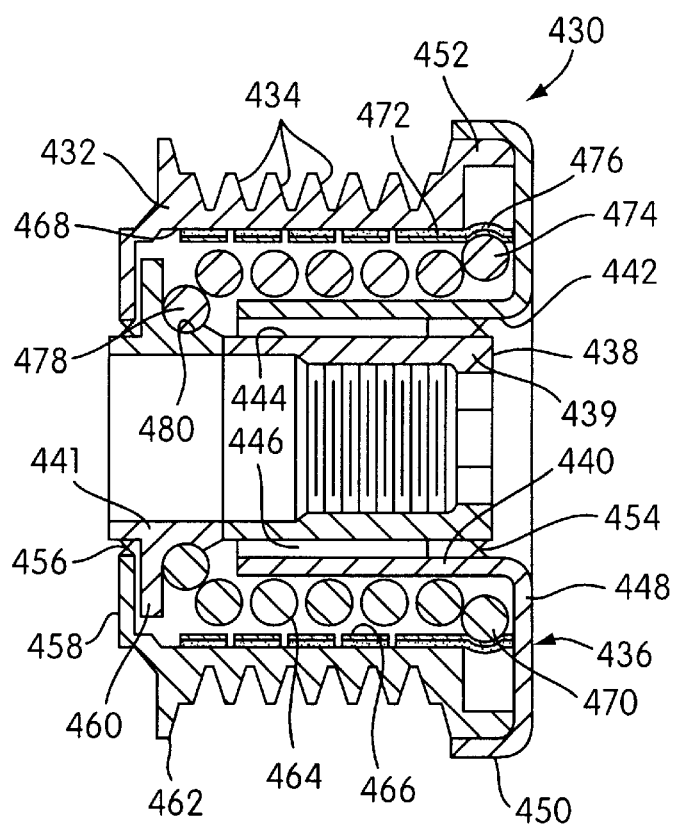
FIG. 14 is a cross-sectional view of a ninth embodiment of an overrunning alternator decoupler in accordance with the principles of the present invention.

Shown in FIG. 14 is a ninth embodiment in accordance with the principles of the present invention. In FIG. 14, the alternator decoupler, generally indicated at 430 includes a pulley member 432 having a plurality of grooves 434 for receiving the ribs of a poly-V belt.

The decoupler 430 further includes a journal member 436, and a mounting sleeve member 438 for mounting the decoupler of the end of an alternator shaft. The journal 436 has a cylindrical sleeve portion 440 which is concentrically disposed about the mounting sleeve 438. The sleeve portion 440 has a cylindrical interior surface 442, and the mounting sleeve 438 has a cylindrical exterior surface 444. A needle bearing assembly 446 is disposed between the interior surface 442 of the journal 436 and the exterior surface 444 of the mounting sleeve 438. The needle bearing assembly 446 mounts the journal 436 for rotation relative to the mounting sleeve 438.

The journal 436 also includes a radially extending wall portion 448 which extends radially outwardly from the front end (away from the engine block and alternator) of the sleeve portion 440. The journal 436 further includes a cylindrical flange portion 450 extending from the wall portion 448 in an axial direction towards the engine block from which the alternator shaft extends. The flange 450 is generally concentrically disposed with respect to the cylindrical sleeve portion 440.

The pulley member 432 has a flange portion 452 at the front end thereof as shown. An exterior cylindrical surface of the flange portion 452 frictionally engages the cylindrical interior surface of flange 450 of the journal to form a rigid connection therebetween. As an alternative to a simple frictional or press-fit connection, the flange 452 of the pulley member 432 can be otherwise fixed, such as being welded, to the flange 450 of the journal 436.

An appropriate seal member 454, such as a nylon ring seal is provided between the sleeve portion 440 of the journal 436 and the exterior surface 444 of the mounting sleeve 438 at a position slightly spaced from the needle bearing 446 towards the front end of the decoupler 430. The seal 454 provides a low-friction seal between the surfaces 442 and 444, and prevents foreign matter from infecting the needle bearing 446. A similar seal 456 is disposed between a radially inwardly projecting wall 458 of the pulley member 452 and a radially outwardly projecting wall 460 of the mounting sleeve 438.

A resilient member and one-way clutch assembly is generally indicated at 462. The assembly 462 includes a resilient member in the form of a torsion wire spring 464, the volutes of which have a circular cross-sectional configuration. The assembly 462 further includes a one-way clutch mechanism 466 of similar material construction to the clutch element 76 of the first embodiment. In particular, it is preferred that the one-way 466 include a steel band made of spring material, and a friction material adhered to the radially outer surface thereof. The friction material of the one-way clutch 466 is constructed and arranged to frictionally engage the cylindrical interior surface 468 of the pulley member 432.

The spring member 464 is connected with the one-way clutch member 466 at an annular connection 470 therebetween. In particular, the one-way clutch 466 has an expanded width volute 472 at the axially forwardmost portion of the clutch 466. The forward most volute 474 of spring 464 has an expanded diameter in comparison with the other spring volutes and is constructed and arranged so that the radially outermost peripheral surface thereof is disposed in annular frictional engagement with the interior surface of the expanded width volute 472 of the one-way clutch. Volute 474 of the spring is biased in a radially outwardly expanding manner for engagement with volute 472 of the clutch. Preferably, the expanded width volute of the one-way clutch 464 has a channel 476 formed therein for receiving the peripheral surface of the spring volute 474 to establish the aforementioned frictional engagement, which engagement establishes a fixed, non-slidable connection between the spring 464 and one-way clutch 466. This connection may be enhanced by a weld, or other mechanical locking or crimping configuration. However, because the frictional engagement between the volute 474 and the channel 476 extends substantially along the entire circumference of the volute 474, and because the volute 474 has an expanded diameter, the frictional connection between the spring and clutch is sufficient to maintain a rigid connection.

The opposite end of the spring 464 terminates in an annular, rearwardmost volute 478 which establishes a fixed connection between the spring 464 and the mounting sleeve 438. More specifically, the sleeve 438 has an annular channel 480 formed in the exterior surface thereof. The channel 480 is constructed and arranged to frictionally engage the inner annular surface of the volute 478. The volute 478 is biased radially inwardly for rigidly engaging the channel 480 and to create a frictionally and gripping locking condition between the sleeve 438 and the spring 464.

It can be appreciated from FIG. 14 that the mounting sleeve 438 shown is of two-part construction, including an axially forward most portion 439 having interior threads for receiving the end of the alternator shaft, and an axially rearward most portion 441 for engaging the annular flange of the shaft. Tightening the alternator decoupler 430 at the end of the shaft causes the sleeve portion 439 to apply an axial force on the sleeve portion 441, so as to sandwich the sleeve portion 441 between the shaft flange and the adjacent annular end surface of the portion 439. It can be appreciated that in an alternate construction, it is contemplated that the mounting sleeve 438 can comprise an integrally formed, unitary member rather than the two-part construction shown.

Because a needle bearing 446 is used in the construction shown in FIG. 14, additional axial space is available for the spring 464 in comparison with the embodiments shown in FIGS. 2 and 7. More specifically, because the needle bearing 446 can be made to have a smaller cross-sectional configuration and smaller outer diameter, the spring 464 can be disposed in surrounding relation in respect to the bearing 446 without greatly increasing the overall diameter of the decoupler. Because the needle bearing does not interfere with the axially extending volutes of the coil spring 464, the spring can be provided with more volutes within the same axially dimensioned decoupler in comparison with those shown in FIGS. 2 and 7. Because more volutes can be provided, the entire forward end volute 474 can be dedicated to making the connection with the one-way clutch member 466 so as to allow a stronger spring to clutch joint. In addition, because the spring can be made larger (more coils), the spring itself is stronger.

Figure 15:
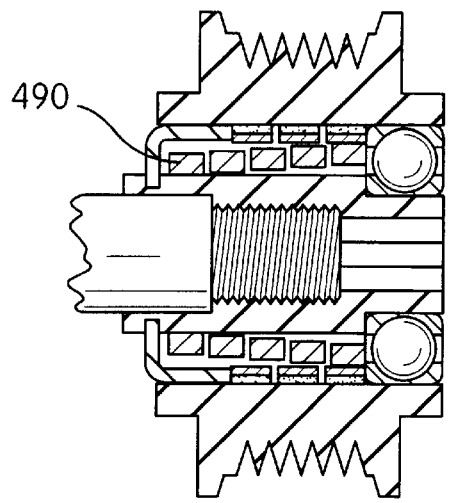
FIG. 15 is a cross-sectional view of a tenth embodiment of an overrunning alternator decoupler in accordance with the principles of the present invention.

FIG. 15 shows a tenth embodiment of an alternator decoupler in accordance with the principles of the present invention. The embodiment shown in FIG. 15 is identical to that shown in FIG. 2, with the exception of the use of a wire spring member 490 having rectangular cross-sectioned volutes in place of the coil spring member 74 which has circular cross-sectional volutes.

Figure 16:
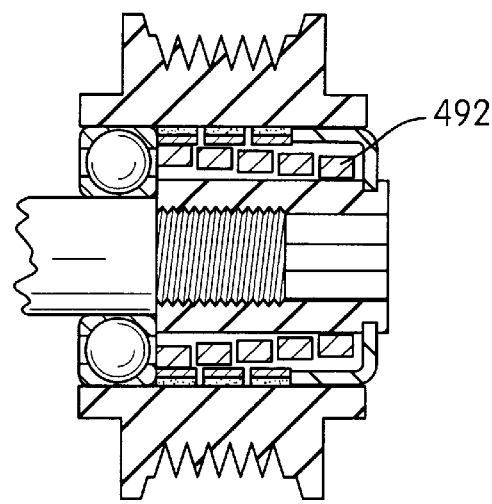
FIG. 16 is a cross-sectional view of an eleventh embodiment of an overrunning alternator decoupler in accordance with the principles of the present invention.

Similarly, FIG. 16 is identical in structure with the decoupler assembly shown in FIG. 7, with the exception of a rectangular wire spring 492 substituted for the spring assembly 274.

Figure 17:
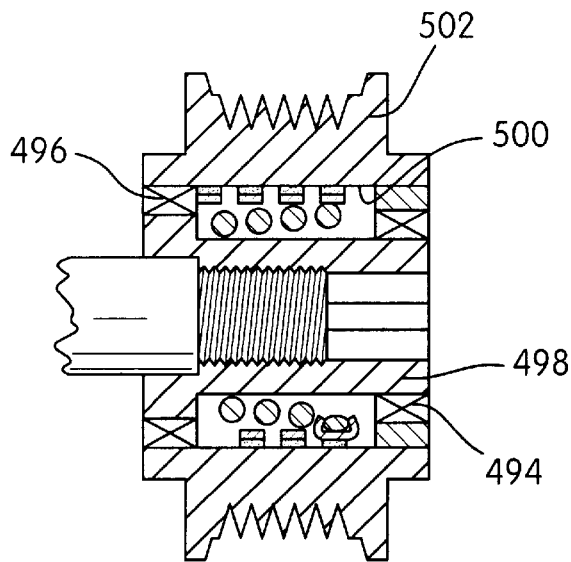
FIG. 17 is a cross-sectional view of a twelfth embodiment of an overrunning alternator decoupler in accordance with the principles of the present invention.

FIG. 17 is a twelfth embodiment of the decoupler in accordance with the principles with the present invention. In this embodiment, a pair of needle bearings 494 and 496 are utilized between the exterior surface of a mounting sleeve 498 and an interior surface 500 of pulley member 502. The needle bearing 494 is at the axially front end of the decoupler assembly, and the needle bearing 496 is disposed at the axially rearward end of the bearing assembly.

Figure 18A:
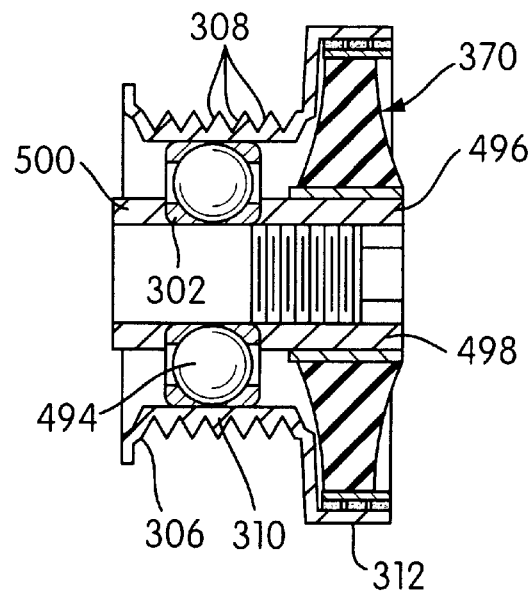
FIG. 18A is a cross-sectional view of a thirteenth embodiment of an overrunning alternator decoupler in accordance with the principles of the present invention.
Figure 18B:
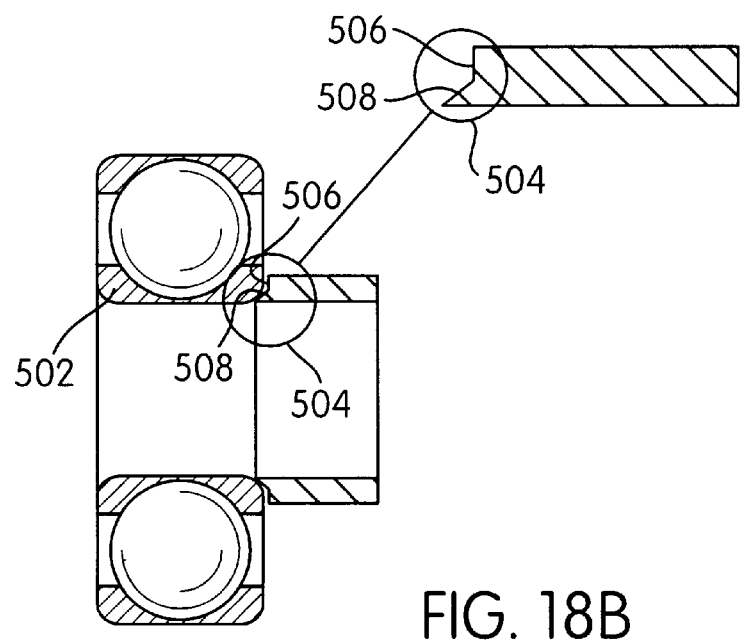
FIG. 18B is an enlarged cross-sectional view of the ball bearing assembly and the sleeve member of the alternator decoupler shown in FIG. 18A.

Turning now to FIGS. 18A and 18B, there is shown a thirteenth embodiment of an alternator decoupler in accordance with the principles of the present invention. The configuration shown in FIG. 18A is substantially identical to that shown in 9A. FIG. 18A differs essentially from FIG. 9A in that ball bearing assembly 494 is used in place of the bearing member 316. The ball bearing assembly is generally centered beneath the narrowed diameter portion 310 of the pulley member 306, so that the belt which engages the narrowed diameter portion 310 is axially balanced on the ball-bearing assembly 494.

As shown, the mounting sleeve 496 for mounting the decoupler on an alternator shaft is preferably of two-part construction, including a front sleeve member 498 and a rear sleeve member 500, with the ball-bearing assembly being disposed therebetween. The ball-bearing assembly 494 has an inner race 502 thereof constructed and arranged to be press-fitted in rigid, non-slip engagement on the alternator shaft, which is received by the mounting sleeve 496. The mounting sleeve 496 is provided with a beveled portion 504 adjacent to the ball bearing assembly 494, as can be appreciated from FIG. 18B. The beveled portion has a first surface portion 506 which is disposed substantially perpendicularly to the axis of the shaft rotation. In addition, the beveled portion 504 includes an angled surface 508, which forms an angle with respect to the surface 506. The angle between surfaces 506 and 508 is preferably between about 145° and 155°. The surfaces 506 and 508 serve to mount the sleeve 496 accurately on an associated alternator shaft. In particular, when the mounting sleeve 498 is tightened onto the alternator shaft, the angled surface 508 centers the sleeve 498 with respect to the shaft axis. Continued tightening of the sleeve 498 on the shaft causes the surface 506 to become flush against the side surface of the inner race 502.

Figure 22:
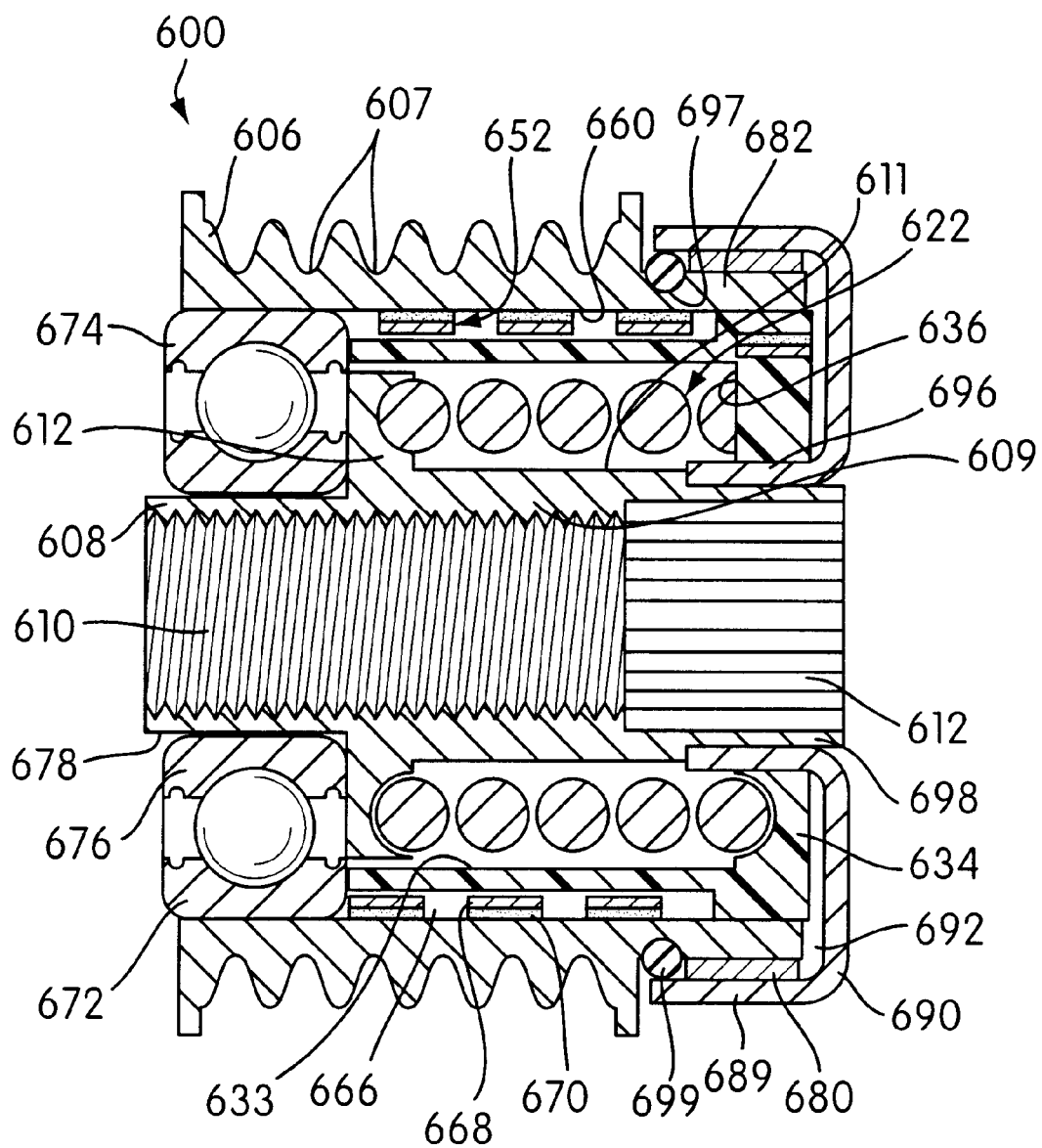
FIG. 22 is a cross-sectional view of a fourteenth embodiment of an overrunning alternator decoupler in accordance with the principles of the present invention.

FIG. 22 is a cross-sectional view and FIG. 23 is an exploded view of a fourteenth embodiment of an overrunning alternator decoupler in accordance with the principles of the present invention. The alternator decoupler, generally indicated at 600 includes a generally cylindrically steel pulley member 606 having poly-V grooves 607. The pulley member 606 is constructed and arranged to engage the poly-V belt 20 of the serpentine drive system 18 illustrated in FIG. 1, so as to receive driving force therefrom, and to operate as part of the decoupler 600, which transmits such force to the alternator shaft 36 on which the alternator decoupler 600 is mounted.

The alternator decoupler 600 is mounted on the alternator shaft 36 end via hub structure 608. The hub structure 608 is provided as a generally cylindrical wall portion 609, the interior surface of which is provided with threads 610 to enable the hub structure 608 to be threaded to cooperating threads on the end portion of alternator shaft 36. Towards front end of the hub structure 608, the interior surface is provided with multiple flats extending around the circumference to form a tool receiving socket 612 providing a socket into which a tool can be used to rotate the hub structure 608 about the rotational axis and thereby threadedly secure the hub structure 608 on the end of alternator shaft 36.

The generally cylindrical wall portion 609 of hub structure 608 has a radially outwardly extending, integrally formed annular flange portion 612. The flange portion 612 has a forwardly facing annular surface 614, with a groove 616 formed therein. The groove 616 is arcuate in cross-sectional form and extends only partially around the circumferential extent of annular surface 614. The groove 616 terminates abruptly at an end stop or perpendicular wall 618, as best shown in FIG. 23. The groove 616 becomes deeper as it extends towards the end stop 618, where it ends abruptly at the perpendicular wall 618. The stop or end wall 618 serves as a stop or support surface for one end 620 of a coil spring 622, made of spring steel. The volutes of the coil spring 622 are disposed in spaced, surrounding relation to the exterior surface of the cylindrical portion 609 of hub structure 608. An opposite end 624 of the coil spring 622 engages a perpendicular wall or end stop 628 formed in a plastic (preferably nylon based) carrier connecting structure 630.

More particularly, the carrier connecting structure 630 comprises a main body portion 632 of a generally cylindrical configuration and an annular ring structure 634 formed the forward end of the cylindrical body portion 632. Preferably, the connecting structure 630 is integrally formed by injection molding plastic into a one-piece structure including main body portion 632 and ring portion 634.

FIG. 24 is a near end plan view of the carrier connecting structure 630 (i.e., as would face the engine block). An annular surface 636 of the ring structure 634 faces in an axial direction, towards the engine block. A radially inner portion of the surface 636, within the circumference defined by the main cylindrical body portion 632 is provided with an arcuate groove 638 of similar configuration as the previously described groove 616. The aforementioned end stop or perpendicular wall 628 forms the end of the groove 638 at the deepest portion of the groove 638. The end stops or walls 628 and 618 provide a sufficient surface area for adequate engagement for the opposite ends 620 and 624 of spring 622 to permit the connecting carrier 630 to rotationally push the end 624 of the spring 622 about the axis of rotation of the decoupler 600, and for the end 620 of the spring 622 to rotationally push the hub 608 about the axis of rotation.

The ring structure 634 has a slot 640 which extends throughout the thickness of the ring structure 634 in the axial direction. The slot 640 has a generally spiral portion 642, which extends from the outer circumference of the ring structure 634 in a circumferential and radially inwardly extending direction. The slot 640 further includes a radially extending portion 644, which extends from the radially innermost portion of the spiral portion 642 radially outwardly and has a length of approximately one-third of the radial extent of the ring structure 634. In general, the intersection of the groove portions 644 and 642 form a right angle. It can be appreciated from the figures that the direction of the groove 640, taken as it extends from the outer periphery of the ring structure 634 in a circumferential direction and radially inwardly, extends in a circumferential direction opposite to the direction in which the groove 638 becomes deeper as it approaches the end stop wall 628.

When the decoupler 600 is at rest, the spring 622 is disposed in spaced relation between an interior cylindrical surface 633 of the cylindrical portion 632 of carrier 630 and an exterior cylindrical surface 611 of wall portion 609.

The slot 640 in the ring structure 634 is constructed and arranged to form a connection with one end of a wrap spring clutch structure 652, and in particular a bent or tabbed end 650 of the wrap spring clutch structure 652. The end 650 of the wrap spring clutch 652 is bent into a right angle configuration, such that the angled or tabbed portion 654 can be received in the radially extending portion 644 of the groove 640. The immediately adjacent portions 656 of the clutch 652 then extend through the spiral portions 642 of the groove 640. While the connecting end 650 of the wrap spring clutch 652 is disposed radially inwardly relative to the main body portion 632 of connecting carrier 630, after the wrap spring clutch 652 leaves the groove 640 it is disposed in generally surrounding relation with respect to the main body portion 632.

The pulley member 606 has an interior cylindrical surface 660, the forwardly disposed portions of which are in surface engagement with a radially outwardly facing cylindrical surface 662 of the ring structure 634. As shown in the cross-sectional view of FIG. 22, the majority of wrap spring clutch assembly 652 is disposed within a space 666 between the inner cylindrical surface 660 of the pulley member 606 and the exterior surface of the cylindrical portion 632 of carrier connecting structure 630.

The wrap spring clutch 652 comprises resilient spring steel material 668 at a radially inner portion thereof, and a friction material 670 bonded to the radially exterior surface of the spring steel 668 as described in detail for the first and second embodiments of FIGS. 2–7.

As also with the first two embodiments, clutch 652 has a diameter in its free state (e.g. as shown in the exploded view of FIG. 23) that has a diameter larger than the diameter defined by the interior surface 660 of the pulley member 606. Thus, when the decoupler 600 is assembled, the friction material 670 of the coils of the clutch 652 are in continuous biased engagement with the interior surface 660 of the pulley member 606.

A ball bearing assembly 672 mounts the pulley member 606 for rotation with respect to the hub structure 608. In particular, the ball bearing assembly 672 has its outer race 674 press fit to the interior surface 660 of the pulley member 606, and its inner race 676 press fit to an exterior surface portion 678 of the hub structure 608 at a position of the cylindrical wall portion 609 closest to the engine or alternator on which this decoupler 600 is mounted.

An annular bushing 680 is disposed in surrounding relation to a portion of the pulley member 606 which is disposed forwardly of the poly-V grooves 607. The portion 682 has a substantial smooth cylindrical outer surface. The radially inwardly facing surface of the bushing 680 is disposed in surface engagement with the smooth cylindrical outer surface of portion 682. The radially outwardly facing surface of the bushing 680 is disposed in surface engagement with an interior cylindrical surface of a radially outward cylindrical wall 689 of an annular end cap 690. The end cap 690 forms an axially rearwardly facing annular channel 692 of a generally U-shaped cross-sectional configuration. The channel 692 of the end cap 690 receives the distal end portion 682 of the pulley member 606, the ring portion 634 of the carrier connecting structure 630, the connecting end portion 650 of the wrap spring clutch 652, the end 624 of the coil spring 622, as well as the bushing 680. A radially inwardly disposed wall portion 696 of bushing 680 has a generally cylindrical configuration which has a radially inwardly facing surface that engages the exterior cylindrical surface of the distal end of cylindrical wall portion 609. In particular, the cylindrical wall portion 609 has a stepped down or radially reduced outer diameter portion 698 which is constructed and arranged to accept the thickness of the radially inner cylindrical wall portion 696 of the end cap 690 in interference fitting relation.

The end portion 682 of the pulley member 606 is further provided with an O-ring groove 697 which is constructed and arranged to receive a rubber O-ring 699 at a position between the bushing 680 and the poly-V grooves 607.

In operation, rotational movement of the pulley member 606 in the direction of arrow A in FIG. 23 will cause a free end 657 of clutch 652 to be engaged and driven. As in the first embodiment, increasing portions of the clutch 652 function in transmitting rotational force from continued input from pulley member 606.

Driving movement of the pulley member 606 in the rotational direction indicated by arrow A causes the clutch 652 to be rotated in a similar direction as indicated by arrow B. Because the end 650 of the clutch assembly 652 is fixed to the connecting carrier 630 at the groove 640, the carrier is driven in the same direction as indicated by arrow B. As a result, the end wall of notch 628 provided in the ring structure 634 engages the end 624 of the coil spring 622, and pushes the spring also in the direction of arrow B. The opposite end 620 of the spring 622 in turn engages the end wall or stop surface 618 formed at the end of groove 616 in the flange 612 of hub structure 608. As a result, the hub 608 is also driven in the direction of arrow B, as indicated by arrow C. This in turn drives the alternator shaft 36 in the direction of arrow C.

During this driving operation, the spring 622 expands under the load to provide elasticity for isolation between the pulley 606 and the alternator shaft 610. In addition, the spring 622 provides for frequency reduction. The expansion of the spring 622 is limited by the cylindrical interior surface 633 of the cylindrical portion 632 of connecting carrier structure 630 so as to prevent undesired over-expansion of the spring 622.

As with each of the embodiments disclosed herein, the resilient spring member 622 transmits the driven rotational movements of said alternator pulley 606 by said serpentine belt to the hub structure 608 such that the alternator shaft 610 is rotated in the same direction as said alternator pulley 606 while being capable of instantaneous relative resilient movements in opposite directions with respect to the alternator pulley 606 during the driven rotational movement thereof. The one-way clutch member 652 is constructed and arranged to allow the hub structure 608 and hence the alternator shaft 610 to rotate at a speed in excess of the rotational speed of the alternator pulley 606 when the speed of the engine output shaft 14 is decelerated to an extent sufficient to establish the torque between said alternator pulley 606 and said hub structure 608 at a predetermined negative level.

FIG. 25 is an exploded view of a fifteenth embodiment of an overrunning alternator decoupler, generally indicated at 700, in accordance with the principles of the present invention. This embodiment is sustantially similar to the fourteenth embodiment illustrated in FIG. 23 with the following exceptions. Similar parts have been labelled with similar reference numerals.

The main difference in the embodiment shown in FIG. 25 and the previous embodiment resides in the direction in which the coil spring, generally indicated at 722, is wound in comparison with the coil spring of the previous embodiment. The spring 722 is wound in an opposite direction in comparison with the spring of the previous embodiment, so that the spring 722 will contract when the alternator shaft 36 is being driven by the pulley member 606.

The coil spring 722 has one end 724 thereof comprising a bent projection extending in the axial direction away from the engine block. The spring 722 further has an opposite end projection 726 which extends from the coils in a direction opposite that of the first end 724, and in a direction towards the engine block.

The alternator decoupler 700 has a hub structure 708 which is substantially the same as the hub structure in the previous embodiment, with the exception that it has a flange portion 712 that is provided with an axially extending hole 718, which is used to replace the groove and end wall or end stop of the previous embodiment. The hole 718 is constructed and arranged to receive the end 726 of the coil spring 722.

The alternator decoupler 700 has a carrier connecting structure 730 which is substantially identical to the previously described carrier structure, with the exception that an axially extending hole 728 is provided in the ring structure 734 in place of the groove and end wall or end stop provided in the ring structure 634 of the previous embodiment. The hole 728 in the ring structure 734 is constructed and arranged to receive the end projection 724 of the coil spring 722.

FIG. 26 is a rear end plan view of the carrier connecting structure 730. As shown, the carrier 730 has the identical clutch receiving slot 640 described with respect to the previous embodiment. This embodiment also includes an identical clutch member 652, pulley member 606, portion 680, and end cap 690.

In accordance with the embodiment shown in FIGS. 25 and 26, it should be appreciated that driven rotational movement of the pulley member 606 in the direction indicated by Arrow A effects driven movement of the clutch 652 in the direction of Arrow B, as in the previous embodiment. Driven movement of the clutch 652 causes driven movement of the carrier connecting member 730 also in the rotational direction of Arrow B. This rotational movement of the carrier connecting member 730 is transmitted to the end 724 of the coil spring 722 and causes the coil spring 722 to contract such that the contraction of the coils will be limited by an exterior cyclindrical surface 709 of the hub structure 708. The opposite end 726 of the spring 722 then drives the hub structure 708, which in turn drives the alternator shaft 36.

Because the exterior cyclindrical surface 709 limits the amount of contraction of the coil spring 722, the spring 722 is prevented from overwinding.

In each of the above disclosed embodiments, the clutch and spring elements of the alternator decoupler are two separate elements connected in series with one another between the pulley member and mounting hub. As a result, the spring or elastic tension provided within the clutch and separate spring can be independently controlled. Thus, the flexibility of the spring steel used for the clutch can be increased (e.g., by making the steel within the clutch thinner, or by changing the tightness of the coils) so as to have a much smaller spring rate in comparison with that for the spring, so that the clutch material engages the friction bearing surface of the pulley member with less force in the overrun condition in comparison with an arrangement wherein the flexibility of the clutch is dictated by what is required for the spring member. As a result, the clutch will have a relatively extended life. Other advantages also accrue as can be appreciated from the description.

Preferably, the resilient spring member has a torsional spring rate of more than ten times the torsional spring rate of the clutch member. Optimally, for each embodiment disclosed herein, the resilient spring member which transmits torsional rotation has a spring rate of about 2.0 to 2.5 inch pounds per degree of torsional deflection, while the spring rate of the spring steel used for the clutch has a spring rate of about 0.02 to 0.03 inch pounds per degree or torsional deflection. Thus, the resilient spring member may have a torsional spring rate of greater than one hundred times the torsional spring rate of the clutch member. Preferably, the resilient spring member has a spring rate of above 1.0 inch pounds per degreee of torsional deflection, while the clutch member has a spring rate of less than 0.1 inch pounds per degree of torsional deflection.

In each of the disclosed embodiments, the coefficient of friction for the friction enhancing surface provided by the friction material has a coefficient of friction greater than that for steel. It is also preferable for the friction material of the clutch to have a coefficient of friction to be greater than 0.25, and most preferably between 0.3–0.4 against the steel surface of the pulley.

One further advantage worth repeating is that by providing separate clutch and spring members connected in series, they can be provided in at least partially axially overlapping relation with one another so as to accomplish their respective functions within a relatively small axial space. In addition, because more axial space is provided for each of the clutch and the spring, each can accomplish their respective functions more effectively. For example, because more clutch coils can be accommodated, less wear of clutch friction occurs and the gripping function is enhanced.

Further Embodiments

Although not preferred due to appreciable increase in cost of manufacture, rather than providing a spring and one-way clutch mechanism as separately formed but connected structures, it is possible to use a single, integrally formed member to serve as the spring and one-way clutch member by particularly adapting a single coiled metal structure so that it has a substantial portion thereof acting as the spring mechanism and another substantial portion thereof acting as the clutch mechanism. The clutch portion of the single coil can be modified so as to have a torsional spring rate at least ten times smaller than the torsional spring rate of the spring mechanism. This can be accomplished, for example, by modifying the clutch portion by machining off a portion of the coiled metal material thereof so that it has a smaller radial thickness than the spring portion. As another aspect of the invention, the coefficients of friction of different portions of a single member can be altered by adhering a friction material to a portion of the coiled metal material.

It thus will be seen that the objects of this invention have been fully and effectively accomplished. It will be realized, however, that the foregoing preferred embodiment of the present invention has been shown and described for the purposes of illustrating the structural and functional principles of the invention and is subject to change without departure from such principles. Therefore, this invention includes all modifications encompassed within the spirit and scope of the following claims and equivalents thereof.

What is claimed is:

1. A serpentine belt drive system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof; and wherein said resilient spring member is operatively connected at one end thereof to said hub structure and operatively connected at an opposite end thereof to said one-way clutch member, said one-way clutch member being spring biased radially outwardly so as to have a portion thereof disposed in frictional engagement with said alternator pulley when said alternator pulley is in a static condition, said one-way clutch having increasing portions thereof moved radially outwardly into friction locking engagement with said alternator pulley when said alternator pulley is rotatably driven by said belt to drive said alternator shaft, said one-way clutch member being constructed and arranged to allow said hub structure and hence the alternator shaft to rotate at a speed in excess of the rotational speed of the alternator pulley when the speed of the engine output shaft is decelerated to a predetermined extent.

2. A serpentine belt system according to claim 1, wherein said resilient spring member has a torsional spring rate greater than a torsional spring rate of said one-way clutch member.

3. A serpentine belt system according to claim 2, wherein the torsional spring rate of said resilient spring member is more than ten times greater than the torsional spring rate of said clutch member.

4. A serpentine belt system according to claim 1, wherein said one-way clutch member comprises a material having a greater coefficient of friction than a material of said resilient spring member.

5. A serpentine belt system according to claim 4, wherein said material of said clutch member has a coefficient of friction greater than 0.25 against a steel material of said alternator pulley.

6. A serpentine belt system according to claim 5, wherein said material of said clutch member has a coefficient of friction between 0.30 and 0.40 against the steel material of said alternator pulley.

7. A serpentine belt system according to claim 1, wherein said resilient spring member and said one-way clutch member each comprise coiled steel material, and wherein the coils of said one way clutch member have a radial thickness which is smaller than a radial thickness of the coils of the resilient spring member.

8. A serpentine belt system according to claim 1, wherein said one-way clutch member comprises a coiled steel structure and a friction material carried by said coiled steel structure, said friction material having a coefficient of friction greater than that for said coiled steel structure.

9. A serpentine belt system according to claim 8, wherein said friction material comprises a rubber based material.

10. A serpentine belt system according to claim 1, wherein said resilient spring member comprises a rubber material.

11. A serpentine belt system according to claim 1, wherein said resilient spring member and said one-way clutch member are disposed in axially overlapping relation with respect to one another.

12. A serpentine belt system according to claim 11, wherein said resilient spring member and said one-way clutch member are connected in series with one another by an intermediate, generally tubular member extending in axially overlapping relation with respect to said resilient spring member and said one-way clutch member.

13. A serpentine belt system according to claim 1, wherein said resilient spring member and said one-way clutch member each comprise coiled steel material, wherein the coils of said resilient spring member and the coils of said one-way clutch member are coiled in a same direction as one another, and wherein said resilient spring member contracts radially when resiliently coupling said hub structure for driven rotation by said alternator pulley.

14. A serpentine belt system according to claim 1, wherein said alternator pulley is mounted for relative rotation with respect to said hub structure by a ball bearing assembly and a bushing, said ball bearing assembly and said bushing being axially spaced along said shaft axis from one another.

15. A serpentine belt system according to claim 14, wherein said ball bearing assembly is closer to said alternator assembly than said bushing.

16. A serpentine belt system according to claim 14, wherein said bushing is closer to said alternator assembly than said ball bearing assembly.

17. A serpentine belt system according to claim 1, wherein said resilient spring member comprises a steel coil spring, wherein said one-way clutch member comprises a coiled steel structure and a friction material carried by said coiled steel structure, said friction material having a coefficient of friction greater than a coefficient of friction for said coiled steel structure and greater than a coefficient of friction for said steel coil spring.

18. A serpentine belt system according to claim 17, wherein said friction material is constructed and arranged to be in sliding relationship with said alternator pulley to permit the alternator shaft to rotate at a speed in excess of the rotational speed of the alternator pulley when the speed of the engine output shaft is decelerated to said predetermined extent.

19. A serpentine belt system according to claim 1, wherein said resilient spring member comprises a round wire spring, and wherein said one-way clutch member comprises a coiled steel structure and a friction material carried by said coiled steel structure, said friction material having a coefficient of friction greater than that for said coiled steel structure, and wherein said connection between said resilient spring member and said one-way clutch member comprises a crimped portion of said coiled steel structure in locking engagement with a portion of said round wire spring.

20. A serpentine belt system according to claim 3, wherein the spring rate of said resilient spring member is greater than 1.0 inch pound per degree of torsional deflection, and wherein the spring rate of said clutch member is less than 0.1 inch pounds per degree of torsional deflection.

21. A serpentine belt system according to claim 20, wherein the spring rate of said resilient spring member is greater than one hundred times the spring rate of said one-way clutch member.

22. A serpentine belt system according to claim 1, wherein said resilient member comprises a rubber spring which is compressed while coupling the alternator pulley to the hub structure.

23. A serpentine belt system according to claim 1, wherein said resilient member comprises a rubber spring which is in shear while resiliently coupling the alternator pulley to the hub structure.

24. A serpentine belt system according to claim 1, wherein said resilient spring member comprises a pair of flat wire torsion springs disposed in parallel with one another, said flat wire torsion springs resiliently coupling said alternator pulley with said hub structure in torsionally balanced fashion.

25. A serpentine belt system according to claim 1, wherein said resilient spring member comprises a spring selected from a group comprising a round wire helical coil torsion spring, a round wire axially overlapping spiral torsion spring, a flat wire helical coil torsion spring, or a flat wire axially overlapping spiral torsion spring.

26. A serpentine belt system according to claim 1, wherein said alternator pulley is mounted on said hub structure by a needle bearing.

27. A serpentine belt system according to claim 1, wherein said one-way clutch mechanism comprises a fork-shaped band having a central band portion wrapped in circumferentially overlapping relation with two axially spaced fork portions.

28. A serpentine belt system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch member being constructed and arranged to allow said hub structure and hence the alternator shaft to rotate at a speed in excess of the rotational speed of the alternator pulley when the speed of the engine output shaft is decelerated to a predetermined extent;

wherein said one-way clutch member comprises a coiled steel structure and a friction material carried by said coiled steel structure, said friction material having a coefficient of friction greater than that for said coiled steel structure; and wherein said resilient spring member is fixed at one end thereof to said hub structure and connected at an opposite end thereof to said one-way clutch member, said friction material of said one-way clutch member constructed and arranged to frictionally engage said alternator pulley to enable said resilient spring member to transmit the driven rotational movements of said alternator pulley to said hub structure, said friction material constructed and arranged to be in sliding relationship with said alternator pulley to permit the alternator shaft to rotate at said speed in excess of the rotational speed of the alternator pulley when the speed of the engine output shaft is decelerated to said predetermined extent.

29. A serpentine belt system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch member being constructed and arranged to allow said hub structure and hence the alternator shaft to rotate at a speed in excess of the rotational speed of the alternator pulley when the speed of the engine output shaft is decelerated to a predetermined extent, and wherein said resilient spring member and said one-way clutch member are disposed in axially overlapping relation with respect to one another, said resilient spring member and said one-way clutch member being connected in series with one another by an intermediate, generally tubular member extending in axially overlapping relation with respect to said resilient spring member and said one-way clutch member;

wherein said resilient spring member is generally disposed radially inwardly of said tubular member, and wherein said one-way clutch member is generally disposed radially outwardly of said tubular member, said resilient spring member being connected at one end thereof to said hub structure and at an opposite end thereof to said tubular member, said one-way clutch member being connected at one end thereof to said tubular member and having an opposite end portion thereof constructed and arranged to be in friction gripping engagement with said alternator pulley to enable said resilient spring member to resiliently couple said hub structure with said alternator pulley, said one-way clutch member being in surface sliding relation with said alternator pulley to allow said hub structure and hence the alternator shaft to rotate at said speed in excess of the rotational speed of the alternator pulley when the speed of the engine output shaft is decelerated to said predetermined extent.

30. A serpentine belt system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch member being constricted and arranged to allow said hub structure and hence the alternator shaft to rotate at a speed in excess of the rotational speed of the alternator pulley when the speed of the engine output shaft is decelerated to a predetermined extent; and wherein said resilient spring member and said one-way clutch member each comprise coiled steel material, and wherein the coils of said resilient spring member and the coils of said one-way clutch member are coiled in an opposite direction from one another, and wherein said resilient spring member expands radially when initially resiliently coupling said hub structure for driven rotation by said alternator pulley.

31. A serpentine belt system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch member being constructed and arranged to allow said hub structure and hence the alternator shaft to rotate at a speed in excess of the rotational speed of the alternator pulley when the speed of the engine output shaft is decelerated to a predetermined extent; and wherein said resilient spring member comprises a coil spring fixed at one end thereof to said hub structure and connected at an opposite end thereof to said one-way clutch member, said one-way clutch member comprising a coiled steel structure and a friction material carried by said coiled steel structure, said friction material having a coefficient of friction greater than that for said coiled steel structure, said one-way clutch member having a free end portion thereof biased into engagement with an interior surface of said alternator pulley, said friction material at said free end portion of said one-way clutch member constructed and arranged to frictionally engage said alternator pulley when said alternator pulley is initially driven by said belt, and wherein increasing portions of said one-way clutch member extending away from said free end are engaged with said alternator pulley as said alternator pulley continues to be driven until substantially all of said one-way clutch member is engaged with said pulley and rotation from said alternator pulley is imparted through said connection to said resilient spring member so that said resilient spring member resiliently couples said alternator pulley to said hub structure.

32. A device for transmitting movement from a belt driven by an output shaft of an engine to a shaft of an auxiliary component to be driven, comprising:

a hub structure constructed and arranged to be fixedly carried by said auxiliary shaft for rotation therewith about a shaft axis;

a pulley member mounted on said hub structure and constructed and arranged to engage said belt and be rotatably driven thereby; and a spring and one-way clutch mechanism coupling said pulley member with said hub structure, said spring and one-way clutch mechanism comprising a resilient spring member separately formed from and operatively connected in series with a one-way clutch member, said resilient spring member being constructed and arranged to transmit the driven rotational movements of said pulley member to said hub structure such that said shaft is rotated in the same direction as said pulley while being capable of instantaneous relative resilient movements in opposite directions with respect to said pulley during the driven rotational movement thereof, wherein said resilient spring member is operatively connected at one end thereof to said hub structure and operatively connected at an opposite end thereof to said one-way clutch member, said one-way clutch member being spring biased radially outwardly so as to have a portion thereof disposed in frictional engagement with said pulley when said pulley is in a static condition, said one-way clutch having increasing portions thereof moved radially outwardly into friction locking engagement with said pulley when said auxiliary shaft is being rotatably driven to thereby rotationally couple said pulley to said resilient spring member and enable said resilient spring member to resiliently transmit the driven rotational movements of said pulley to said hub structure, said one-way clutch member being constructed and arranged to allow said hub structure and hence the shaft to rotate at a speed in excess of the rotational speed of the pulley when the speed of the driven pulley is decelerated to a predetermined extent.

33. A device according to claim 32, wherein said one-way clutch member comprises a material having a greater coefficient of friction than a material of said resilient spring member.

34. A device according to claim 33, wherein said material of said clutch member has a coefficient of friction greater than 0.25 against a steel material of said pulley member.

35. A device according to claim 34, wherein said material of said one-way clutch member has a coefficient of friction between 0.30 and 0.40 against the steel material of the pulley member.

36. A device according to claim 32, wherein said resilient spring member and said one-way clutch member each comprise coiled steel material, and wherein the coils of said one way clutch member have a radial thickness which is smaller than a radial thickness of the coils of the resilient spring member.

37. A device according to claim 32, wherein said one-way clutch member comprises a coiled steel structure and a friction material carried by said coiled steel structure, said friction material having a coefficient of friction greater than that for said coiled steel structure.

38. A device according to claim 32, wherein said resilient spring member and said one-way clutch member are disposed in axially overlapping relation with respect to one another.

39. A device according to claim 32, wherein said resilient spring member comprises a steel coil spring, wherein said one-way clutch member comprises a coiled steel structure and a friction material carried by said coiled steel structure, said friction material having a coefficient of friction greater than a coefficient of friction for said coiled steel structure and greater than a coefficient of friction for said steel coil spring.

40. A device according to claim 39, wherein said friction material is constructed and arranged to be in sliding relationship with said pulley to permit the hub to rotate at a speed in excess of the rotational speed of the pulley when the speed of the pulley is decelerated to said predetermined extent.

41. A device according to claim 32, wherein said resilient spring member comprises a spring selected from a group comprising a round wire helical coil torsion spring, a round wire axially overlapping spiral torsion spring, a flat wire helical coil torsion spring, a flat wire axially overlapping spiral torsion spring, or a spring made from a rubber material.

42. A device for transmitting movement from a belt driven by an output shaft of an engine to a shaft of an auxiliary component to be driven, comprising:

a hub structure constructed and arranged to be fixedly carried by said auxiliary shaft for rotation therewith about a shaft axis;

a pulley member mounted on said hub structure and constructed and arranged to engage said belt and be rotatable driven thereby; and a spring and one-way clutch mechanism coupling said pulley member with said hub structure, said spring and one-way clutch mechanism comprising a resilient spring member separately formed from and operatively connected in series with a one-way clutch member, said resilient spring member being constructed and arranged to transmit the driven rotational movements of said pulley member to said hub structure such that said shaft is rotated in the same direction as said pulley while being capable of instantaneous relative resilient movements in opposite directions with respect to said pulley during the driven rotational movement thereof, said one-way clutch member being constructed and arranged to allow said hub structure and hence the shaft to rotate at a speed in excess of the rotational speed of the pulley when the speed of the driven pulley is decelerated to a predetermined extent, wherein said one-way clutch member comprises a friction material having a greater coefficient of friction than a material of said resilient spring member, and wherein said resilient spring member has a torsional spring rate greater than a torsional spring rate of said one-way clutch member.

43. A device according to claim 42, wherein the torsional spring rate of said resilient spring member is more than ten times greater than the torsional spring rate of said clutch member.

44. A device for transmitting movement from a belt driven by an output shaft of an engine to a shaft of an auxiliary component to be driven, comprising:

a hub structure constructed and arranged to be fixedly carried by said auxiliary shaft for rotation therewith about a shaft axis;

a pulley member mounted on said hub structure and constructed and arranged to engage said belt and be rotatably driven thereby; and a spring and one-way clutch mechanism coupling said pulley member with said hub structure, said spring and one-way clutch mechanism comprising a resilient sprint member separately formed from and operatively connected in series with a one-way clutch member, said resilient spring member being constructed and arranged to transmit the driven rotational movements of said pulley member to said hub structure such that said shaft is rotated in the same direction as said pulley while being capable of instantaneous relative resilient movements in opposite directions with respect to said pulley during the driven rotational movement thereof, said one-way clutch member being constructed and arranged to allow said hub structure and hence the shaft to rotate at a speed in excess of the rotational speed of the pulley when the speed of the driven pulley is decelerated to a predetermined extent, wherein said one-way clutch member comprises a coiled steel structure and a friction material carried by said coiled steel structure, said friction material having a coefficient of friction greater than that for said coiled steel structure; and wherein said resilient spring member is fixed at one end thereof to said hub structure and connected at an opposite end thereof to said one-way clutch member, said friction material of said one-way clutch member constructed and arranged to frictionally engage said pulley to enable said resilient spring member to transmit the driven rotational movements of said pulley to said hub structure, said friction material constructed and arranged to be in sliding relationship with said pulley to permit the hub structure and hence said shaft to rotate at said speed in excess of the rotational speed of the pulley when the speed of the driven pulley is decelerated to said predetermined extent.

45. A device for transmitting movement from a belt driven by an output shaft of an engine to a shaft of an auxiliary component to be driven, comprising:

a hub structure constructed and arranged to be fixedly carried by said auxiliary shaft for rotation therewith about a shaft axis;

a pulley member mounted on said hub structure and constructed and arranged to engage said belt and be rotatably driven thereby; and a spring and one-way clutch mechanism coupling said pulley member with said hub structure, said spring and one-way clutch mechanism comprising a resilient spring member separately formed from and connected in series with a one-way clutch member, said resilient spring member being constructed and arranged to transmit the driven rotational movements of said pulley member to said hub structure such that said shaft is rotated in the same direction as said pulley while being capable of instantaneous relative resilient movements in opposite directions with respect to said pulley during the driven rotational movement thereof, said one-way clutch member being constructed and arranged to allow said hub structure and hence the shaft to rotate at a speed in excess of the rotational speed of the pulley when the speed of the driven pulley is decelerated to a predetermined extent, and wherein said resilient spring member and said one-way clutch member are disposed in axially overlapping relation with respect to one another; and wherein said resilient spring member and said one-way clutch member are connected in series with one another by an intermediate, generally tubular member extending in axially overlapping relation with respect to said resilient spring member and said one-way clutch member, said resilient spring member being disposed generally radially inwardly of said tubular member, said one-way clutch member being disposed generally radially outwardly of said tubular member, said resilient spring member being connected at one end thereof to said hub structure and at an opposite end thereof to said tubular member, said one-way clutch member being connected at one end thereof to said tubular member and having an opposite end portion thereof constructed and arranged to be in friction gripping engagement with said pulley to enable said resilient spring member to resiliently couple said hub structure with said pulley, said one-way clutch member being in surface sliding relation with said pulley to allow said hub structure and hence said shaft to rotate at said speed in excess of the rotational speed of the pulley when the speed of the pulley is decelerated to said predetermined extent.

46. A device for transmitting movement from a belt driven by an output shaft of an engine to a shaft of an auxiliary component to be driven, comprising:

a hub structure constructed and arranged to be fixedly carried by said auxiliary shaft for rotation therewith about a shaft axis;

a pulley member mounted on said hub structure and constructed and arranged to engage said belt and be rotatably driven thereby; and a spring and one-way clutch mechanism coupling said pulley member with said hub structure, said spring and one-way clutch mechanism comprising a resilient spring member separately formed from and connected in series with a one-way clutch member, said resilient spring member being constructed and arranged to transmit the driven rotational movements of said pulley member to said hub structure such that said shaft is rotated in the same direction as said pulley while being capable of instantaneous relative resilient movements in opposite directions with respect to said pulley during the driven rotational movement thereof, said one-way clutch member being constricted and arranged to allow said hub structure and hence the shaft to rotate at a speed in excess of the rotational speed of the pulley when the speed of the driven pulley is decelerated to a predetermined extent; and wherein said resilient spring member comprises a coil spring fixed at one end thereof to said hub structure and connected at an opposite end thereof to said one-way clutch member, said one-way clutch member comprising a coiled steel structure and a friction material carried by said coiled steel structure, said friction material having a coefficient of friction greater than that for said coiled steel structure, said one-way clutch member having a free end portion thereof biased into engagement with an interior surface of said pulley, said friction material at said free end portion of said one-way clutch member constructed and arranged to frictionally engage said pulley when said pulley is initially driven by said belt, and wherein increasing portions of said one-way clutch member extending away from said free end are engaged with said pulley as said pulley continues to be driven until substantially all of said one-way clutch member is engaged with said pulley and rotation from said pulley is imparted through said connection to said resilient spring member so that said resilient spring member resiliently couples said pulley to said hub structure.

47. A serpentine belt drive system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring portion disposed in series with a one-way clutch portion, said resilient spring portion having a torsional spring rate at least ten times greater than a torsional spring rate of said one-way clutch portion, said resilient spring portion being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch portion being constructed and arranged to allow said hub structure and hence the alternator shaft to rotate at a speed in excess of the rotational speed of the alternator pulley when the speed of the engine output shaft is decelerated to an extent sufficient to establish the torque between said alternator pulley and said hub structure at a predetermined negative level.

48. A serpentine belt drive system according to claim 47, wherein said resilient spring portion and said one-way clutch portion are formed separately and connected to one another.

49. A serpentine belt drive system according to claim 47, wherein said resilient spring member and said one-way clutch member each comprise coiled steel, and wherein said one-way clutch portion comprises a friction enhancing surface disposed thereon.

50. A serpentine belt drive system according to claim 49, wherein said friction enhancing surface comprises a rubber based material.

51. A serpentine belt drive system according to claim 50, wherein said rubber based material of said friction enhancing surface is constructed and arranged to frictionally engage said alternator pulley to enable said resilient spring portion to be resiliently coupled between said alternator pulley and said hub structure, said rubber based material of said friction enhancing surface constructed and arranged to be in sliding relationship with said alternator pulley to permit the hub structure and hence the alternator shaft to rotate at a speed in excess of the rotational speed of the alternator pulley when the speed of the engine output shaft is decelerated to said extent sufficient to establish the torque between said alternator pulley and said hub structure at said predetermined negative level.

52. A serpentine belt drive system according to claim 47, wherein said resilient spring portion and said one-way clutch portion are formed separately and connected to one another.

53. A serpentine belt drive system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring portion disposed in series with a helical one-way clutch portion, said one-way clutch portion comprising a material having coefficient of friction greater that a coefficient of friction of a material of said spring portion, said resilient spring member having a torsional spring rate greater than a torsional spring rate of said one-way clutch member, said resilient spring portion being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch portion being constructed and arranged to allow said hub structure and hence the alternator shaft to rotate at a speed in excess of the rotational speed of the alternator pulley when the speed of the engine output shaft is decelerated to a predetermined extent.

54. A serpentine belt drive system according to claim 53, wherein said resilient spring portion and said one-way clutch portion are formed separately and connected to one another.

55. A serpentine belt drive system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring portion disposed in series with a one-way clutch portion, said one-way clutch member being spring biased radially outwardly so as to have a portion thereof disposed in frictional engagement with said alternator pulley when said alternator pulley is in a static condition, said one-way clutch having increasing portions thereof moved radially outwardly into friction locking engagement with said alternator pulley when said alternator pulley is rotatably driven by said belt to drive said alternator shaft, said resilient spring portion being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said one-way clutch portion being constructed and arranged to allow said hub structure and hence the alternator shaft to rotate at a speed in excess of the rotational speed of the alternator pulley when the speed of the engine output shaft is decelerated to a predetermined extent.

56. A serpentine belt drive system for an automotive vehicle comprising:

a drive assembly including an internal combustion engine having an output shaft with a driving pulley thereon rotatable about a driving pulley axis, a sequence of driven assemblies each having a driven pulley rotatable about an axis parallel with said driving pulley axis, and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including an alternator shaft mounted for rotation about a shaft axis, a hub structure fixedly carried by said alternator shaft for rotation therewith about the shaft axis; and a spring and one-way clutch mechanism coupling said alternator pulley with said hub structure, said spring and one-way clutch mechanism comprising a resilient spring member formed separately from and operatively connected in series with a one-way clutch member, said resilient spring member comprising a helical coil torsion spring, being constructed and arranged to transmit the driven rotational movements of said alternator pulley by said serpentine belt to said hub structure such that said alternator shaft is rotated in the same direction as said alternator pulley while being capable of instantaneous relative resilient movements in opposite directions with respect to said alternator pulley during the driven rotational movement thereof, said torsion spring having the helical coils thereof oriented to expand radially when initially transmitting the rotational movements of said alternator pulley to said hub structure said one-way clutch member being constructed and arranged to allow said hub structure and hence the alternator shaft to rotate at a speed in excess of the rotational speed of the alternator pulley when the speed of the engine output shaft is decelerated to a predetermined extent.

* * * * *